(12) United States Patent
Gupta et al.

(10) Patent No.: US 8,274,974 B1
(45) Date of Patent: Sep. 25, 2012

(54) METHOD AND APPARATUS FOR PROVIDING QUALITY OF SERVICE ACROSS A SWITCHED BACKPLANE FOR MULTICAST PACKETS

(75) Inventors: Rajarshi Gupta, Berkeley, CA (US); Justin Chueh, Palo Alto, CA (US); Ravi Tangirala, San Jose, CA (US); Meera Kasinathan, San Jose, CA (US); Erik Swenson, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 397 days.

(21) Appl. No.: 11/865,018

(22) Filed: Sep. 30, 2007

Related U.S. Application Data

(63) Continuation of application No. 10/205,822, filed on Jul. 26, 2002, now Pat. No. 7,286,552.

(51) Int. Cl.
*H04L 12/28* (2006.01)
*H04L 12/56* (2006.01)
*H04L 12/26* (2006.01)
*H04L 12/16* (2006.01)

(52) U.S. Cl. ........ 370/389; 370/230; 370/230.1; 370/231; 370/232; 370/235; 370/237; 370/238; 370/412; 370/395.7

(58) Field of Classification Search .......... 370/397, 370/412, 413, 399, 409, 426, 432, 395.1, 370/389, 395.7, 471, 230, 414, 230.1, 231, 370/232, 235, 237, 238
See application file for complete search history.

(56) References Cited

U.S. PATENT DOCUMENTS

| | | | |
|---|---|---|---|
| 5,483,522 A | 1/1996 | Derby et al. | |
| 5,633,861 A | 5/1997 | Hanson et al. | |
| 5,787,071 A | 7/1998 | Basso et al. | |
| 5,949,784 A * | 9/1999 | Sodder | 370/397 |
| 5,991,297 A * | 11/1999 | Palnati et al. | 370/389 |
| 6,031,843 A | 2/2000 | Swanbery et al. | |
| 6,118,761 A | 9/2000 | Kalkunte | |
| 6,625,121 B1 | 9/2003 | Lau et al. | |
| 6,697,368 B2 | 2/2004 | Chang et al. | |
| 6,772,222 B1 | 8/2004 | Gallo et al. | |
| 6,907,001 B1 | 6/2005 | Nakayama et al. | |

(Continued)

OTHER PUBLICATIONS

McKeown, Nick, "White Paper: A Fast Switched Backplane for a Gigabit Switched Router", *Business Communications*, Dec. 1997, Printed from www.bcr.com on Jan. 9, 2002 (Dec. 1997), 35 pgs.

(Continued)

*Primary Examiner* — Kwang B Yao
*Assistant Examiner* — Adam Duda
(74) *Attorney, Agent, or Firm* — Blakely, Sokoloff, Taylor & Zafman

(57) ABSTRACT

A method and system is provided to enable quality of service across a backplane switch for multicast packets. For multicast traffic, an egress queue manager manages congestion control in accordance with multicast scheduling flags. A multicast scheduling flag is associated with each egress queue capable of receiving a packet from a multicast ingress queue. When the multicast scheduling flag is set and the congested egress queue is an outer queue, the egress queue manager refrains from dequeueing any marked multicast packets to the destination ports associated with the congested outer queue until the congestion subsides. When the congested egress queue is a backplane queue, the egress queue manager refrains from dequeuing any marked multicast packets to the destination ports on the destination blade associated with the congested backplane queue until the congestion subsides.

4 Claims, 17 Drawing Sheets

U.S. PATENT DOCUMENTS

| | | | |
|---|---|---|---|
| 6,973,032 B1 * | 12/2005 | Casley et al. | 370/230 |
| 7,027,457 B1 | 4/2006 | Chiussi | |
| 7,103,041 B1 | 9/2006 | Speiser et al. | |
| 7,130,271 B1 | 10/2006 | Sekihata | |
| 2002/0034181 A1 | 3/2002 | Kalkunte et al. | |
| 2002/0107908 A1 | 8/2002 | Dharanikota | |
| 2002/0176431 A1 | 11/2002 | Golla et al. | |
| 2002/0186703 A1 | 12/2002 | West | |
| 2003/0058880 A1 | 3/2003 | Sarkinen et al. | |
| 2003/0099193 A1 | 5/2003 | Liu et al. | |
| 2003/0105903 A1 | 6/2003 | Garnett et al. | |
| 2003/0128703 A1 | 7/2003 | Zhao et al. | |
| 2003/0147387 A1 | 8/2003 | Devi et al. | |
| 2004/0037223 A1 | 2/2004 | Harrison et al. | |
| 2005/0125514 A1 * | 6/2005 | Balakrishnan | 709/221 |

OTHER PUBLICATIONS

Office Action from U.S. Appl. No. 10/205,822 mailed Oct. 10, 2006, 10 pgs.

Notice of Allowance for U.S. Appl. No. 10/213,032 dated May 1, 2009; 6 pages.

USPTO, "OA Mailed Oct. 20, 2008 for U.S. Appl. No. 10/213,032", (Oct. 20, 2008); Whole Document.

* cited by examiner

CONGESTION/RESUME
MESSAGE FORMAT

200A

EGRESS QUEUE MGR ACTIONS WHEN GENERATING A CONGESTION MESSAGE

202 — EGRESS QUEUE (B, P, Q) CONGESTED ?

204 — SEND CONGESTION MESSAGE TO INGRESS QUEUE MGR ON LOCAL BLADE ↔ FIG. 12

206 — IS PORT = BACKPLANE — NO

208 — REDUCE THE RATE OF DEQUEUEING PACKETS FROM EGRESS QUEUES TO DESTINATION BLADE B' TO THE MIN RATE

210 — SEND CONG MESSAGE TO EGRESS QUEUE MGRS ON OTHER BLADES

FIG. 8

METHOD AND APPARATUS FOR PROVIDING QUALITY OF SERVICE ACROSS A SWITCHED BACKPLANE FOR MULTICAST PACKETS

CROSS REFERENCE TO RELATED APPLICATIONS

This application is a continuation of and claims priority to U.S. patent application Ser. No. 10/205,822, entitled "Method And Apparatus For Providing Quality of Service Across a Switched Backplane for Multicast Packets", filed Jul. 26, 2002, which is related to pending U.S. application Ser. No. 10/188,614, entitled "Method And Apparatus For Providing Quality Of Service Across A Switched Backplane Between Egress Queue Managers", and pending U.S. application Ser. No. 10/213,032, entitled "Method And Apparatus For Providing Quality Of Service Across A Switched Backplane Between Egress and Ingress Queue Managers".

TECHNICAL FIELD

The present invention relates to the field of computer networks and internetworking communications technologies. In particular, the present invention relates to providing quality of service in a network.

BACKGROUND AND RELATED ART

In today's modern networks, routers and other network devices are vulnerable to data packet traffic congestion. Because network traffic is typically bursty, it is not unusual for a router to be suddenly inundated with a sharp increase in traffic. Quality of service (QoS) refers to the ability of the network to handle such bursts in traffic without unacceptable loss of data packets. QoS has become increasingly important as newer Internet applications demand high bandwidth and low latency, such as in audio and video streaming or voice over internet (VOI) applications. To ensure QoS, each network device must be capable of handling such bursts in traffic, as the QoS is only as good as each of the devices on the network can provide.

In an effort to alleviate some of the traffic congestion, architects have improved the performance of Internet routers by replacing the congested shared backplanes used in conventional routers with faster switched backplanes that allow multiple packets to be transferred simultaneously. McKeown, *A Fast Switched Backplane for a Gigabit Switched Router*, Business Communications Review, December, 1997. Today, a high-performance Internet router typically comprises a plurality of input/output cards ("blades" herein) that receive, buffer, and transmit data packets. Using a central switched backplane, also referred to as a crossbar switch, multiple blades can communicate with each other simultaneously, enabling data packets to be sent from one blade to another across "backplane channels."

In a typical high-performance Internet router having a switched backplane, traffic is received, buffered, and transmitted using hundreds or thousands of queues. The queues that receive the packets from other devices on the network are referred to as ingress queues and the queues transmitting the packets to other devices are referred to as egress queues. The ingress and egress queues are mapped to one another so that one or more of the ingress queues feed into one or more of the egress queues. In some cases, the ingress queues may be capable of handling packets at a faster rate than the egress queues. When the network traffic increases, the resulting congestion is typically localized at one or more of the egress queues on one of the blades, while the source of the congestion may be any of the ingress queues on the same blade or on one or more of the other blades. Conflicts can arise if more than one ingress queue wants to send a data packet to the same egress queue at the same time, or if the rate at which the ingress queue is sending packets exceeds the rate at which the egress queue can receive packets.

One drawback to using the central switched backplane is that the crossbar switch by itself has no QoS capabilities. As a result, when the traffic in the queues is transmitted across a backplane channel, the QoS policy for the packet cannot be enforced, and packets may get dropped unfairly.

FIG. 1 illustrates an example scenario of multiple ingress queues mapped to one egress queue and unfair dropping of packets from the ingress queues due to congestion. As shown, three ingress queues 110 with minimum sending rates of 5, 7, and 8 megabits per second (Mbps), respectively, are mapped to an egress queue that can only service a maximum of 20 Mbps. When some of the ingress queues experience traffic flows that cause them to simultaneously exceed their minimum sending rate, as in the illustrated example of sending 6 Mbps instead of 5 Mbps, and 10 Mbps instead of 8 Mbps, the egress queue 112 gets congested. The egress queue 112 will have to "drop" packets by dropping (6+7+10)−20=3 megabits of the 23 megabits of received traffic, which means that not all of the packets reach their intended destination. But dropping the packets is unfair since packets from all three traffic flows are dropped instead of just packets from the offending traffic flows.

One technique used to avoid such unfair dropping of packets when sending packets across the backplane channels is a time-division multiplex (TDM) scheme. In a TDM scheme, the channel's available sending time is divided into intervals, where the first ingress queue sends its packets during the first interval, the second ingress queue sends its packets during the second interval, and the third ingress queue sends its packets during the third interval, and so forth. However, the TDM scheme is inefficient, as some intervals are wasted when held open even though the corresponding ingress queue has no packet to send.

An alternative scheme to avoid dropping packets is to buffer the excess packets in the queues until there is an opportunity to send them without risk of being dropped, i.e., after the congestion has subsided and the channels are open. However, buffering the packets requires memory and memory is expensive.

Yet another alternative is to use a backpressure mechanism, where the egress queue experiencing the congestion sends feedback to the ingress queue to reduce the rate at which it is sending packets. The backpressure mechanism works well when deployed in a single chip. However, when the egress queues and ingress queues reside on different blades within the router, or even on different chips within the blade, the ability to timely communicate the feedback to the ingress queue is reduced.

Moreover, when a single ingress queue is mapped to multiple egress queues, such as when the incoming traffic on several ports of the router is aggregated together into a single ingress queue on a blade, the backpressure mechanism can result in an undesirable head-of-the-line blocking scenario. The head-of-the-line blocking scenario occurs when only one or some of the egress queues is congested, but the feedback to the single ingress queue causes all of the aggregated traffic to slow down, even traffic destined for the uncongested egress queues. A similar undesirable head-of-the-line blocking scenario occurs for multicast traffic, where the multicast traffic to all of the egress queues is slowed down, even though only one or some of the egress queues receiving the multicast traffic are experiencing congestion.

SUMMARY

A method is provided in which quality of service is enabled across a switched backplane using a messaging system.

According to one aspect of the invention, each blade in a router having a switched backplane is provided with one or more ingress queues buffering incoming traffic, one or more egress queues buffering outgoing traffic, and a queue manager.

According to one aspect of the invention, the egress queues include outer queues and backplane queues. Traffic on an outer queue is destined for another router, whereas traffic on a backplane queue is destined for another blade in the same router.

According to one aspect of the invention, the queue manager includes an ingress queue manager and an egress queue manager which each manage the traffic on their respective queues in accordance with the messaging system.

According to one aspect of the invention, the messaging system includes a congestion message and a resume message. The egress queue manager generates a congestion message when the traffic in an egress queue exceeds an upper queue threshold, and a resume message when the traffic in the congested egress queue falls below a lower queue threshold.

According to one aspect of the invention, the egress queue manager uses a queue timer in conjunction with the queue thresholds to repeat the generation of the congestion and resume messages to increase the robustness of the messaging system. When an egress queue timer expires, the queue manager generates a congestion or resume message in accordance with the queue threshold.

According to one aspect of the invention, the congestion messages are propagated to the ingress queue manager on the local blade. The congestion message causes the ingress queue manager to reduce the rate at which packets are dequeued from the ingress queues that may be responsible for the congestion. The ingress queues that may be responsible for the congestion are those ingress queues mapped to the destination ports associated with the congested queue. According to one aspect of the invention, the ingress queue manager reduces the rate at which packets are dequeued to no lower than the committed information rate for the router.

According to one aspect of the invention, when the congested queue is a backplane queue, the congestion message causes the ingress queue manager to reduce the rate at which packets are dequeued from any ingress queue mapped to any port on the destination blade associated with the congested backplane queue. In addition, the congestion messages are propagated to the egress queue managers on each of the other blades in the router. An egress queue manager that receives a message from another blade further propagates the message to the ingress queue manager on its own blade, where the message causes the ingress queue manager to reduce the rate at which packets are dequeued from any of the ingress queues on that blade that may also be responsible for the congestion. In addition, the egress queue manager reduces the rate at which packets are enqueued to the backplane port mapped to congested backplane queue. As a result, quality of service policies are propagated across the switched backplane.

According to one aspect of the invention, each blade is further provided with congestion flags that indicate which of the backplane queues is congested both on the local blade and on the destination blades. The egress queue manager uses the congestion flags in conjunction with the queue thresholds and queue timers to aid in determining when to generate the resume messages to cause the ingress and egress queue managers to resume normal packet rates for the previously slowed ingress queues and backplane ports.

According to one aspect of the invention, when a previously congested egress queue falls below the lower queue threshold, the egress queue manager generates a resume message and clears the congestion flag associated with the previously congested queue. Similarly to the congestion messages, the resume message is propagated to the ingress queue manager and to the egress queue managers on the other blades. However, when the egress queue in question is a backplane queue, the egress queue manager delays generating a resume message and clearing the congestion flag until the congestion flags indicate that all of the other egress queues mapped to the same destination blade are also not congested. In addition, the egress queue manager further delays resuming normal packet rates until the congestion flags indicate that all of the egress queues on other blades mapped to the same destination blade are also not congested.

According to one aspect of the invention, each blade is further provided with ingress queue flags which indicate which ingress queues are operating at reduced packet rates. When the previously congested egress queue is a backplane queue, the resume message causes the ingress queue manager to resume the normal packet rates for all ingress queues mapped to the backplane ports associated with the backplane queue. When the previously congested egress queue is an outer queue, the resume message causes the ingress queue manager to resume the normal packet rates for all ingress queues mapped to the outer ports associated with the outer queue, but only after the ingress queue flags indicate that all of the other ingress queues mapped to those same outer ports have also resumed normal packet rates. This insures that the normal quality of service is not resumed prematurely, i.e., when other egress queues serving those same outer ports are still congested.

According to one aspect of the invention, the ingress queues may be designated as unicast queues or multicast queues. For multicast traffic, enabling quality of service through congestion control is managed by the egress queue managers in accordance with multicast scheduling flags. A multicast scheduling flag is associated with each egress queue capable of receiving a packet from a multicast queue. When the multicast scheduling flag is set and the congested egress queue is an outer queue, the egress queue manager refrains from enqueueing any marked multicast packets to the destination ports associated with the congested outer queue until the congestion subsides. When the congested egress queue is a backplane queue, the egress queue manager refrains from enqueuing any marked multicast packets to the destination ports on the destination blade associated with the congested backplane queue until the congestion subsides.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above and other methods.

BRIEF DESCRIPTION OF DRAWINGS

The present invention will be described by way of exemplary embodiments, but not limitations, illustrated in the accompanying drawings in which like references denote similar elements, and in which:

FIGS. 8-15 are flow diagrams illustrating certain aspects of a method to be performed by a packet forwarding device incorporating a messaging system enabling quality of service in accordance with one embodiment of the invention illustrated in FIGS. 2-7.

DETAILED DESCRIPTION OF THE INVENTION

In the following description various aspects of the present invention, a method and apparatus for a messaging system to enable quality of service in a packet forwarding device, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and apparatus is implemented in a router, bridge, server or gateway, or as a software routine, hardware circuit, firmware, or a combination thereof.

Parts of the description will be presented using terminology commonly employed by those skilled in the art to convey the substance of their work to others skilled in the art, including terms of operations performed by a computer system or a packet forwarding device, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 2:
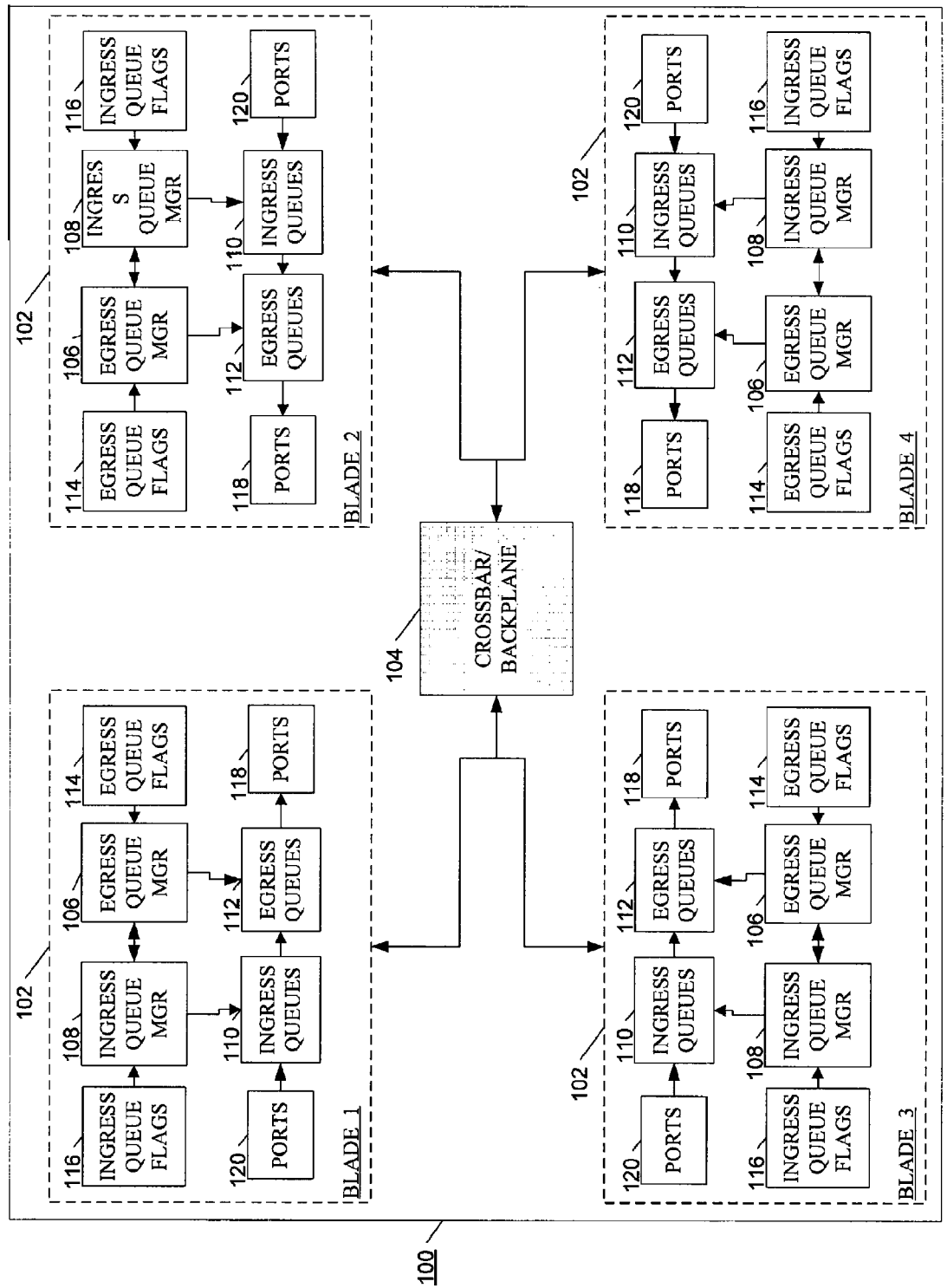
FIG. 2 is a block diagram illustrating a packet forwarding device incorporating a method and apparatus for enabling quality of service in accordance with one embodiment of the invention, and the operating environment in which certain aspects of the invention may be practiced.

FIG. 2 is a block diagram illustrating a generalized embodiment of a packet forwarding device incorporating a method and apparatus for enabling quality of service in accordance with one embodiment of the invention, and the operating environment in which certain aspects of the invention may be practiced. The packet forwarding device 100 is typically a high-performance Internet router providing layer-3 internetwork packet forwarding services for hosts connected to the Internet via a local area network (LAN). The router 100 may be comprised of several blades 102 connected to one another using a crossbar 104, also referred to as a switched backplane. In the illustrated embodiment, the router 100 is shown with four blades 102, each comprising an egress queue manager 106, an ingress queue manager 108, each of which manage thousands of egress queues 112 and ingress queues 110 respectively, using egress queue flags 114 and ingress queue flags 116. In turn, the egress queues 112 and ingress queues 110 are respectively connected to numerous ports 118 and 120, which serve as the router's physical link to the rest of the network.

In one embodiment, a typical router 100 may have up to 16 such blades, each having a combined aggregate rate of 80 gigabits per second (Gbps). Of the 80 Gbps throughput per blade, 40 Gbps may be used to connect the blade to the backplane 104, and the remaining 40 Gbps may be used to connect the blade to the rest of the network, depending on the needs of the particular applications that the router 100 is supporting. In one embodiment, each blade supports 8 output channels and a central processing unit CPU channel at 10 Gbps.

Figure 3:
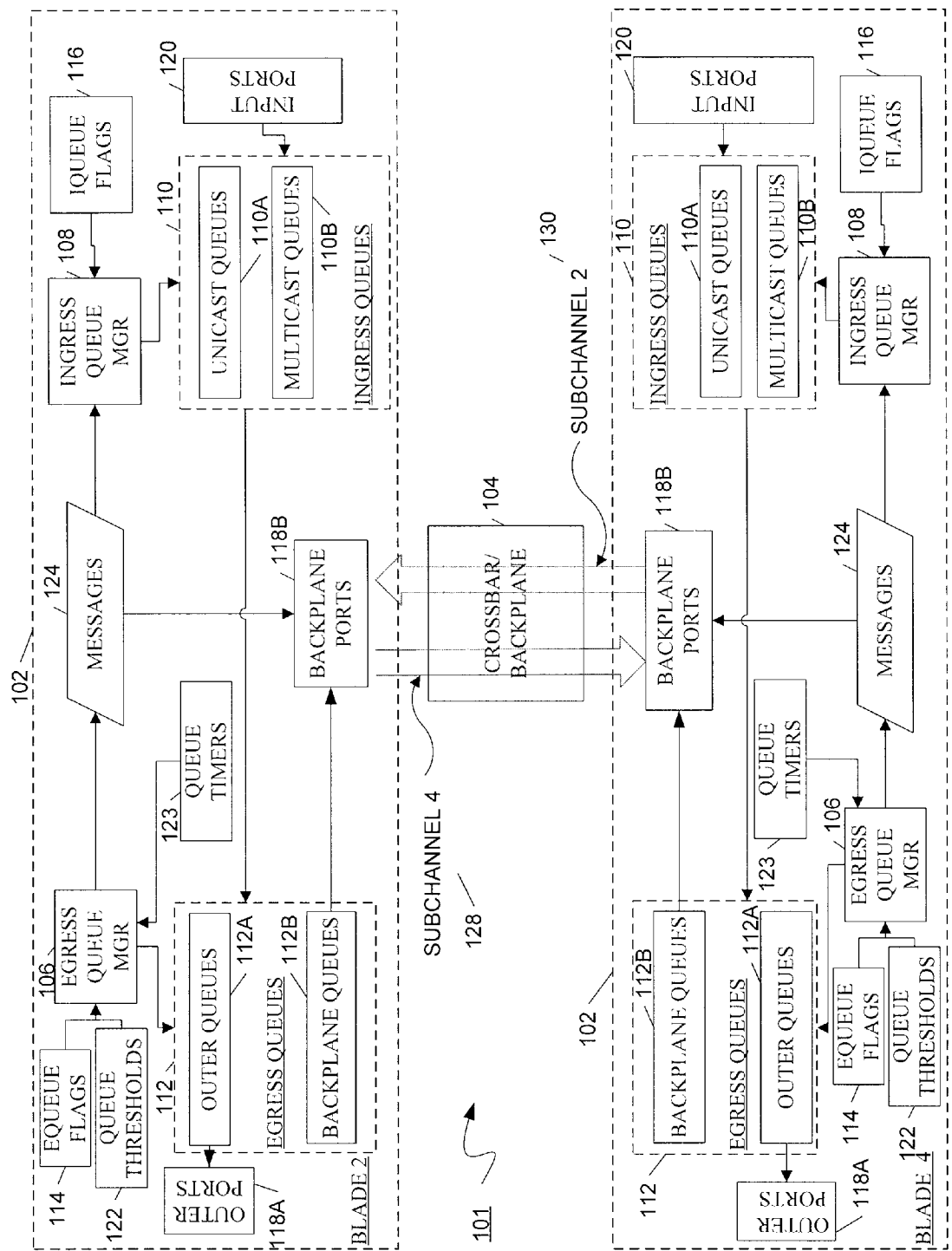
FIG. 3 is a block diagram illustrating certain additional aspects of the embodiment of the invention illustrated FIG. 2.

FIG. 3 is a block diagram illustrating certain additional aspects of the embodiment of the invention illustrated FIG. 2. In particular, two of the blades 102, Blade 2 and Blade 4, are shown in further detail. The egress queue manager 106 and ingress queue manager 108 together with the queue thresholds 122, queue timers 123, egress queue flags 114, ingress queue flags 116, and messages 124 comprise a messaging system 101 to enable quality of service on router 100 having a switched backplane 104, ingress queues 110, egress queues 112 and ports 118, 120, and associated other components.

In one embodiment, the egress queues 112 comprise outer queues 112A that are connected to outer ports 118A, which connect the router to the rest of the network, and backplane queues 112B that are connected to backplane ports 118B, which connect the blade 102 to the backplane 104 and the other blades 102 in the router 100 using backplane subchannels 2 and 4 (128) (130). For example, when Blade 2 sends data to an outer port on Blade 4, the data is sent via a Blade 2 backplane port 118B and subchannel 4 (130), and when Blade 4 sends data to an outer port on Blade 2, the data is sent via a Blade 4 backplane port 118B and subchannel 2 (128).

The egress queue manager 106 operates in conjunction with the queue thresholds 122 and the egress queue flags 114 to manage all of the scheduling and queuing of data packets to the outer ports 118A and the backplane ports 118B. The ingress queue manager 108 operates in conjunction with the ingress queue flags 116 and feedback from the egress queue manager 106 in the form of messages 124 to manage all of the scheduling and queueing of data packets in the ingress queues 110.

In one embodiment, the queue thresholds 122 comprise values that indicate the upper and lower queue sizes, and may be configured to suit the needs of the network applications which the router 100 is supporting. When an egress queue 112 exceeds the upper queue threshold, the egress queue manager 106 generates congestion messages 124 to the ingress queue manager 108 to cause the ingress queues 110 responsible for causing the congestion to slow down the rates at which packets are dequeued to the congested egress queues 112. In addition, when the egress queue 112 that is exceeding the upper queue threshold is a backplane queue 112B, then the egress queue manager 106 sends the congestion messages 124 across the backplane to the other blades on the router 100 to cause the egress and ingress queue managers on those blades to take similar actions to cause the ingress queues responsible for causing the congestion to the backplane queue 112B to slow down their packet rates. In one embodiment, the congestion messages 124 are sent to the other blades using a separate control backplane (not shown) instead of the same backplane used by the data packets. The egress queue manager 106 further slows down the dequeuing of packets from the congested backplane queue 112B, as well as from any other egress queue mapped to the same backplane port to which the congested backplane queue is mapped. In this way, the congestion is quickly brought under control, and the quality of service is enabled across the backplane switch 104.

When the queue size drops below the lower queue threshold, the egress queue manager 106 determines that the egress queue 112 is no longer congested and generates resume messages 124 to the ingress queue manager 108 to resume normal packet rates on the ingress queues 110 whose rates were previously reduced in accordance with the values of the ingress queue flags 116. The ingress queue flags 116 comprise stored values that indicate the state of congestion of outer egress queues 112A. Specifically, since an ingress queue 110 may be mapped to many outer queues 112A on the blade, the ingress queue flags 124 represent the state of congestion of all outer queues 112A to which a particular ingress queue 110 is mapped. For example, when one ingress queue is mapped to eight different outer queues 112A, then the ingress queue flags 126 for that ingress queue 110 comprise eight values, one for each mapped outer queue 112A. When any one of the values indicate that a mapped outer queue 112A is congested, then the reduced packet rates on that ingress queue 110 are maintained. But when all of the values indicate that the mapped outer queues are no longer congested, then normal packet rates are resumed.

In one embodiment, the ingress queue flags 126 may be implemented as a bitmask, where each bit in the mask represents one ingress queue. It is understood by one of ordinary skill in the art that the ingress queue flags 126 may be implemented as a table or a database or other type of repository without departing from the scope of the present invention.

In addition, when the egress queue is a backplane queue 112B, the egress queue manager 106 resumes the normal rate of dequeuing packets from the previously congested queue in accordance with the values of the egress queue flags 114. The egress queue flags 114 comprise stored values that indicate the state of congestion of the backplane queues 112B on both the local and the other blades 102. In one embodiment, the egress queue flags 124 may be implemented as a bitmask. For example, in a router 100 having 16 blades, the bitmask comprises 16 bits, with one bit for each of the blades 102. For instance, in the egress queue flags 124 on Blade 2, the fourth egress queue flag, representing the state of backplane congestion to Blade 4, may have a 1 in the $5^{th}$ and $9^{th}$ bits, and zeroes in the $2^{nd}$ and remaining bits. The bit values indicate that even though the local backplane queues on Blade 2 destined for Blade 4 are not congested, Blade 4 is nevertheless considered to be congested since the local egress queue manager 106 has received congestion notifications from the egress queue managers 106 on Blades 5 and 9, indicating that their backplane queues destined for Blade 4 are congested. The local egress queue manager 106 resumes normal dequeuing of packets from the local backplane queues destined for Blade 4 only after all of the backplane queues of other blades destined for Blade 4 are also not congested. It is understood by one of ordinary skill in the art that the egress queue flags 124 may be implemented as a table or a database or other type of repository without departing from the scope of the present invention.

In one embodiment, the messaging system 101 provides for the possibility of lost messages 124 due to signal degradation or various other reasons. Lost messages can cause problems with unfairness, since the messaging system 101 might cause a reduction in the rate of dequeueing packets from some ingress and egress queues and not others.

For example, if a backplane congestion message is lost, then the egress queue manager 106 that generated the congestion message reduces the normal rate of dequeuing packets from the congested backplane queue, but some or all of the other egress queue managers on the other blades will not take similar action since they missed the message. Should this situation persist, then the local backplane queues managed by the egress queue manager 106 that generated the congestion message will be at a disadvantage.

The messaging system 101 is already resilient to losses in messages related to backplane queues 112B. When the traffic for the subchannel to the destination blade causing the congestion, e.g. Blade 4, is exceeding its capacity, then eventually some other backplane queue on another blade will become congested, and the egress queue manager on that blade will send a new congestion message to all of the other blades. Assuming the new congestion message is not lost, then the situation will resolve on its own. When the total traffic for the subchannel to the destination blade causing the congestion is within the subchannel capacities then eventually the backplane queues whose packet rates were reduced will empty, including the backplane queue that originally caused the first congestion message to be generated, and normal operations will resume.

But waiting until additional egress queues become congested and exceed queue thresholds is not sufficiently robust to ensure fairness. Likewise, waiting until the congested egress queues fall below queue thresholds is not sufficiently robust to ensure fairness. Therefore, in one embodiment, the messaging system 101 further employs a queue timer 123 in conjunction with the queue thresholds 122 to trigger the generation of additional congestion and resume messages 124 at pre-determined intervals. When the queue timer 123 for a particular egress queue 112 expires, the egress queue manager 106 will test the egress queue 112 for congestion in accordance with the queue thresholds 122. In one embodiment, the queue timer 123 is a very long cyclic timer that has each of the egress queues 112 positioned at a fixed slot, staggered across the entire clock duration. Every time the queue timer 123 reaches the appropriate trigger time for a particular egress queue 112, the egress queue manager 106 will generate a message 124 for the particular egress queue 112. When the queue 112 is still congested (i.e., the queue exceeds the queue threshold), then the egress queue manager 106 generates a congestion message; otherwise the egress queue manager 106 will generate a resume message. The above-described timeout mechanism may be employed on the outer queues 112A, or the backplane queues 112B, or both. Moreover, the queue timer 123 may be employed to safeguard the reliablity of messages 124 to the local ingress queue manager 108 on the same blade or across the backplane 104 to other egress queue managers 106 on other blades, the latter being more susceptible to loss than the former.

In one embodiment, the repeated generation of messages 124 to avoid problems with lost messages may introduce additional queuing problems with the messages 124 themselves, particularly when the messages 124 are destined for egress queue managers 106 on other blades and must traverse the backplane 104 or another separate control backplane reserved for the messages 124. For example, it may be possible to have multiple messages 124 queued up when the messages are generated every clock pulse, but cannot be sent every clock pulse (e.g., when the messages can only be sent every M clocks). Therefore, in one embodiment, the messaging system 101 further prioritizes the messages 124, with the congestion messages having a higher priority than the resume messages, and the queue length derived messages (i.e., those messages generated solely due to the egress queue exceeding or falling below the queue threshold 122) having a higher priority than the queue timer derived messages (i.e., those messages generated after the queue timer expired). In addition, in one embodiment, the message system 101 further prioritizes the messages 124, with the messages associated with backplane congestion on the backplane queues 112B having a higher priority than those associated with congestion on the outer queues 112A. Table 1 illustrates an example of the priority ranking of the messages 124 that may occur in messaging system 101. It should be understood by one of ordinary skill in the art that other prioritization of the messages 124 may be employed without departing from the scope of the invention.

TABLE 1

| MESSAGE PRIORITY | MESSAGE DESCRIPTION |
| --- | --- |
| (Highest) 1 | Queue length derived congestion message for backplane queue |
| 2 | Queue length derived congestion message for outer queue |
| 3 | Queue length derived resume message for backplane queue |
| 4 | Queue length derived resume message for outer queue |
| 5 | Timer derived congestion message for backplane queue |
| 6 | Timer derived congestion message for outer queue |
| 7 | Timer derived resume message for backplane queue |
| 8 (Lowest) | Timer derived resume message for outer queue |

In a typical embodiment of a router 100 having 16 blades, there may be 8 backplane queues 112B for each of the 16 subchannels for each of 8 output channels, in addition to 128 outer queues 112A, resulting in a total of 1152 egress queues 112. It is understood by one of ordinary skill in the art, other numbers of egress queues 112 may be employed without departing from the scope of the present invention.

In one embodiment, the ingress queues 110 comprise unicast queues 110A and multicast queues 110B, which connect the blade 102 to the input ports 120 that receive the data packets from other devices on the network. The unicast queues 110A handle unicast data packets that are sent to a single destination, whereas the multicast queues 110B handle multicast packets that are sent to multiple destinations.

In a typical embodiment each blade may support up to 4000 ingress queues 110, each having a minimum and maximum bandwidth rate for each egress queue 112 to which they are mapped. It is understood by one of ordinary skill in the art that other numbers of ingress queues 110 may be employed without departing from the scope of the present invention.

FIGS. 4A-4D illustrate examples of queue mapping that may be employed using an embodiment of the invention illustrated in FIGS. 2-3. Queue mapping is a significant aspect of enabling quality of service since a typical router may have more ingress queues than egress queues. Even if the number of egress queues exceeds the number of ingress queues, the egress queues are often equipped with much less buffer storage than the ingress queues. Thus, depending on the router, it may be preferable to exploit the buffering in the ingress queues 110 rather than risk exceeding the buffering in the egress queues 112.

Figure 4A:
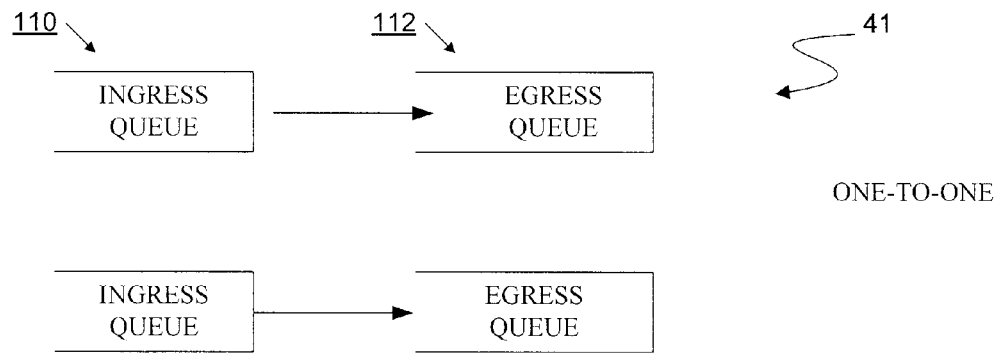
FIGS. 4A-4D illustrate examples of queue mapping that may be employed using an embodiment of the invention illustrated in FIGS. 2-3.

In one embodiment of the present invention, the queues may be configured so that specific ingress queues map to specific egress queues 112. FIG. 4A illustrates a one-to-one mapping 41, where one ingress queue 110 is mapped to one egress queue 112. One-to-one mapping implies that all of the packets that arrive at this particular ingress queue are destined for the same egress queue 112 on a particular blade 102. In this case, the ingress queue functions as an extension to the egress queue 112, and congestion control is very fair since the traffic flows using this data path do not mix with other traffic flows, except when traversing the backplane 104.

Figure 1:
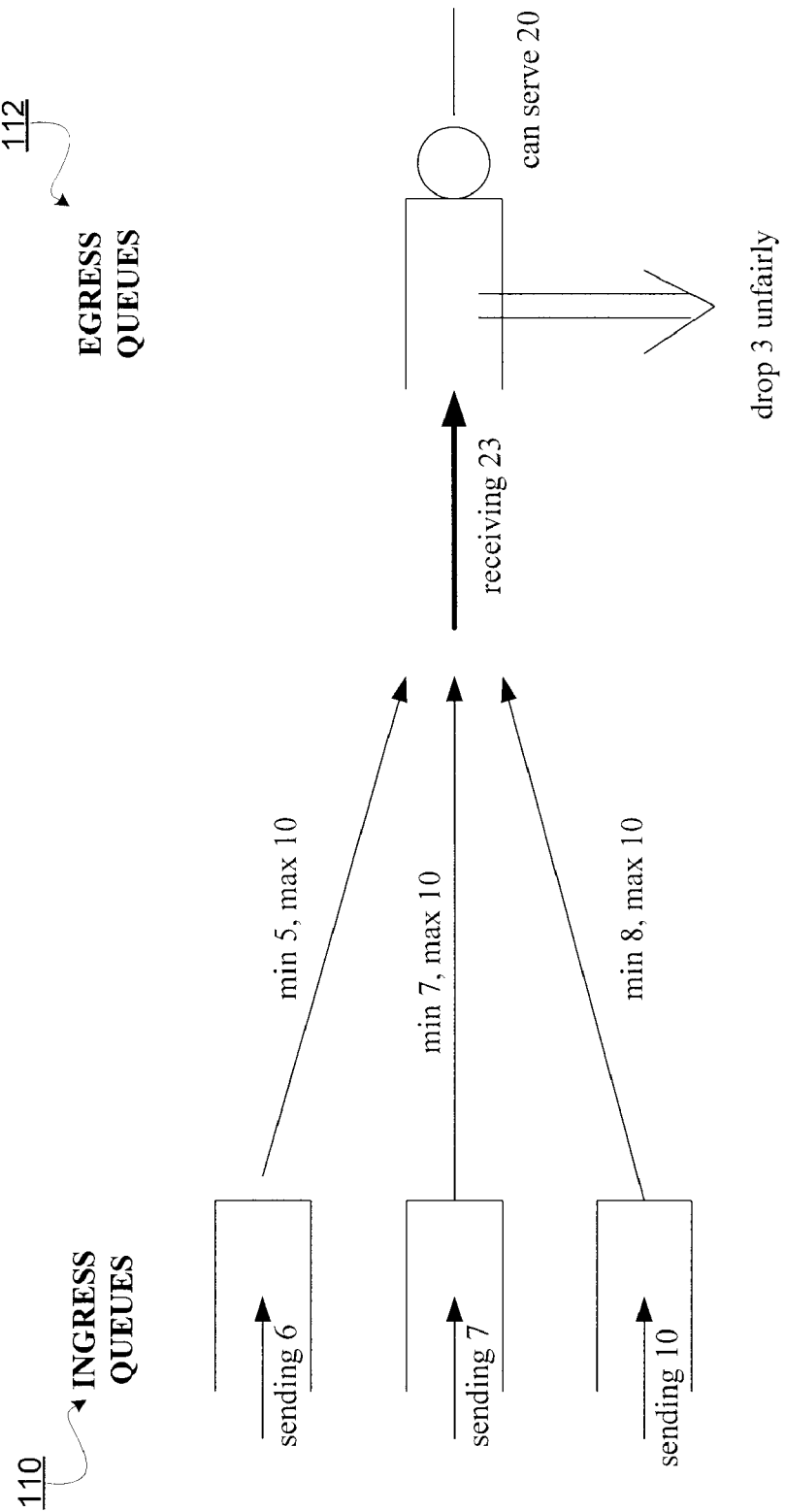
FIG. 1 illustrates an example scenario of multiple ingress queues mapped to one egress queues and unfair dropping of packets from the ingress queues due to congestion.
Figure 4B:
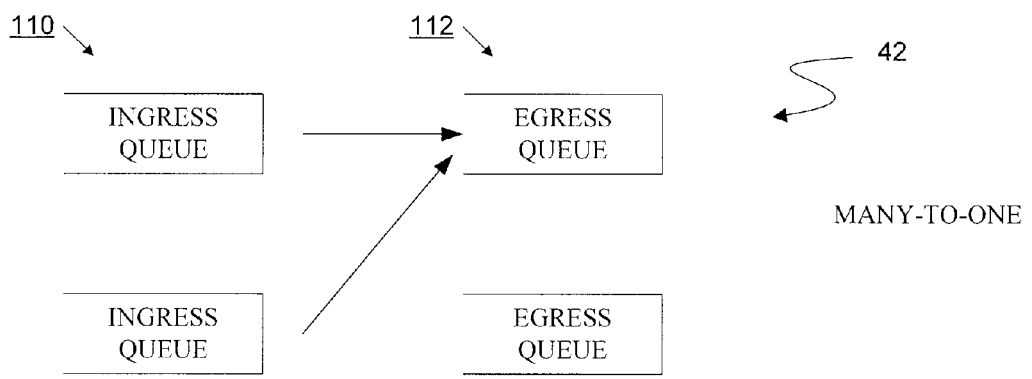

FIG. 4B illustrates a many-to-one mapping 42, where many ingress queues 110 are mapped to one egress queue 112, similar to that described in the example scenario of FIG. 1. This is a likely scenario when the same output port is used by a large number of traffic flows. Since in a typical embodiment, each output port will support only eight egress queues, it is often necessary to aggregate many ingress queues into each one of the eight egress queues. If the egress queue 112 is congested, any one of the multiple ingress queues 110 may be responsible. Since it is difficult to determine which of the ingress queues 110 is responsible, congestion control is less fair.

Figure 4C:
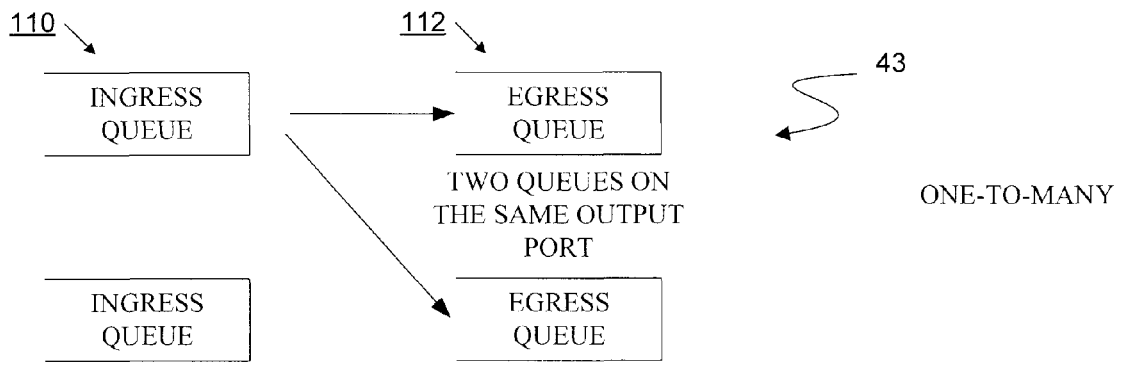

FIG. 4C illustrates a one-to-many mapping 43. As noted above, an ingress queue 110 may be mapped to several outer queues 112A. One-to-many mapping arises when the ingress rate is limited on a per-port basis and the incoming traffic of a port is aggregated into one or a few ingress queues. In this case, in order to avoid the head-of-the-line blocking problem previously described, the quality of service controlled flows from a particular ingress queue may only be mapped to multiple egress queues when all of the egress queues in question are on the same output port. In this way, the unfair congestion control caused by a single ingress queue does not affect the traffic flows destined for other output ports.

Figure 4D:
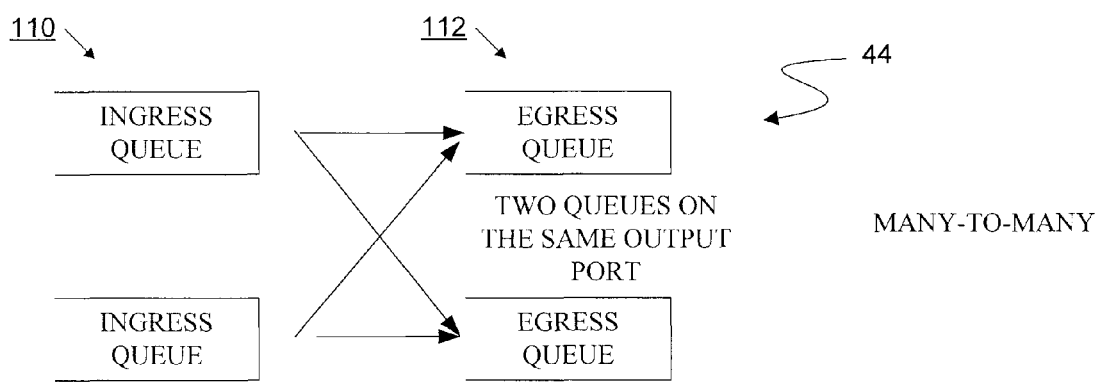

FIG. 4D illustrates the many-to-many mapping 44, which is a combination of the one-to-many 43 and many-to-one 42 scenarios already described. As with the one-to-many mapping 43, in order to avoid the head-of-the-line blocking problem, the quality of service controlled flows from a particular ingress queue may only be mapped to multiple egress queues when all of the egress queues in question are on the same output port.

Figure 5:
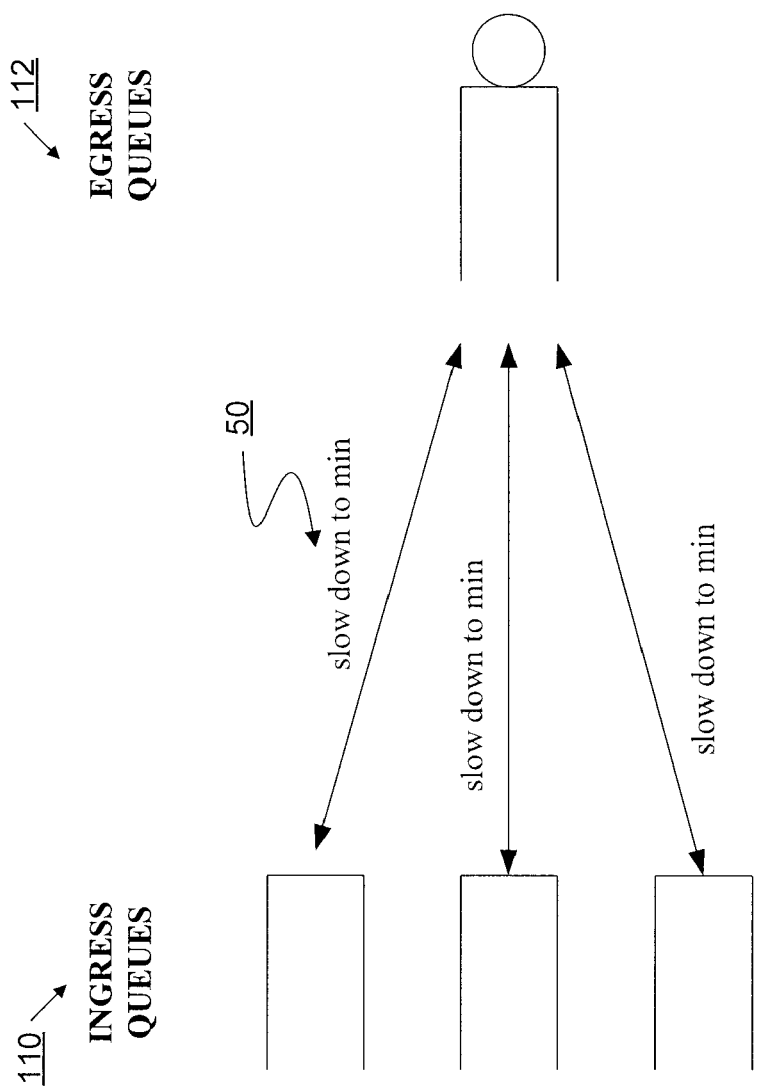
FIG. 5 illustrates the example scenario in FIG. 1, in which certain aspects of a messaging system enabling quality of service may be practiced in accordance with one embodiment of the invention illustrated in FIGS. 2-3.

FIG. 5 illustrates the example many-to-one mapping scenario described in FIGS. 1 and 4C, in which certain aspects of a messaging system 101 enabling quality of service may be practiced in accordance with one embodiment of the invention illustrated in FIGS. 2-3. As shown, the messaging system 101 conveys to the ingress queues 110 the feedback, i.e., the messages 124, generated by the egress queue manager 106 to reduce the rate at which the packets are dequeued from the responsible ingress queues 110 to the minimum rates designated for minimum quality of service on those queues. In one embodiment, the ingress queue manager 110 reduces the rate no lower than the committed information rate for the router.

Figure 6:
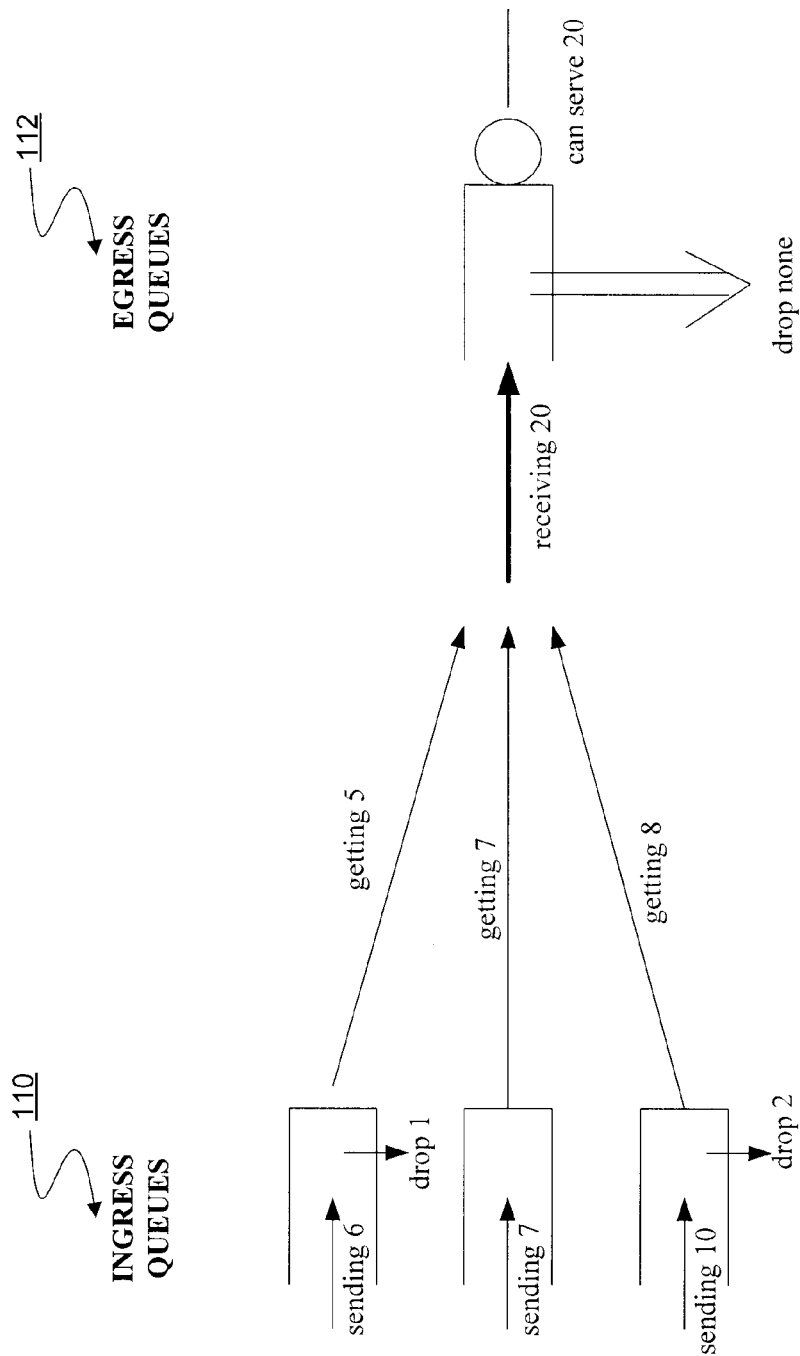
FIG. 6 further illustrates the example scenario in FIGS. 1 and 5, in which certain aspects of a messaging system enabling quality of service may be practiced in accordance with one embodiment of the invention illustrated in FIGS. 2-3.

FIG. 6 further illustrates the example scenario in FIGS. 1, 4C and 5, in which certain aspects of a messaging system 101 enabling quality of service may be practiced in accordance with one embodiment of the invention illustrated in FIGS. 2-3. As shown, the results of the feedback conveyed to the ingress queues 110 to slow down to the minimum rates reveals that only those ingress queues 110 responsible for the errant flows drop packets, and the egress queue 112 receiving the packets drops none.

Figure 7:
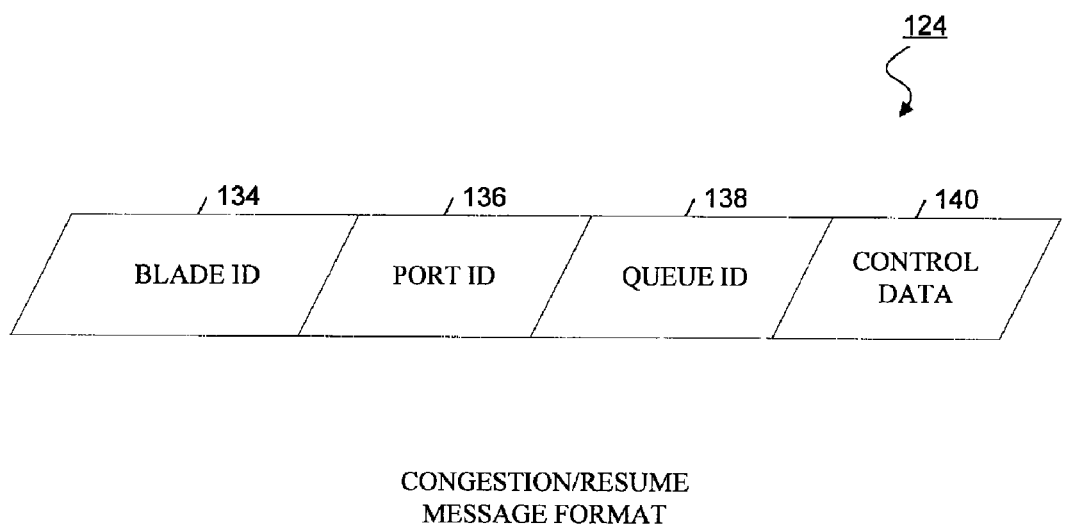
FIG. 7 illustrates the a format of the congestion and resume messages in accordance with one embodiment of the invention illustrated FIGS. 2-6.

FIG. 7 illustrates the format of the congestion and resume messages 124 in accordance with one embodiment of the invention illustrated FIGS. 2-6. Each message 124 comprises three different data fields that together uniquely identify one of the egress queues 112 in the router 100. One data field is the blade identification 134, the value of which is the number or other identifying information of the blade on which the egress queue resides. Another data field is the port identification 136, the value of which is the number or other identifying information of the port to which the traffic flows on the egress queue 112 are destined. Yet another data field is the queue identification 138, the value of which is the number or other identifying information of the egress queue 112 within the port and blade identified by blade identification 134. Thus, for example, queue number 1234 on Port 6 of Blade 2 can be uniquely distinguished from queue number 1234 on Port 7 of Blade 4. A control data field 140 is further provided to indicate whether the message is a congestion message indicating that the egress queue size has exceeded the upper queue threshold, or a resume message indicating the egress queue size has fallen below the lower queue threshold. It should be noted that the order in which the data fields are illustrated is for convenience only, and may be otherwise ordered without departing from the scope of the present invention.

Turning now to FIGS. 8-14, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media). The computer-executable instructions may be written in a computer programming language or may be embodied in firmware logic, or in hardware such as in an application specific integrated circuit (ASIC). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

FIGS. 8-14 are flow diagrams illustrating certain aspects of a method to be performed by a packet forwarding device incorporating a messaging system 101 enabling quality of service in accordance with one embodiment of the invention illustrated in FIGS. 2-7. Throughout the description of FIGS. 8-14, the identity of the congested egress queue is expressed using notation (B, P, Q), where B denotes the blade identification 134, P denotes the port identification 136, and Q denotes the queue identification 138. In addition, the use of B' denotes the blade identification 134 of the destination blade associated with a backplane P port identification 136. Thus, for example, egress queue (3, 48, 2) refers to queue Q2 in port P48 on blade B3. Where port P48 is a backplane port mapped to subchannel 4, then the destination blade B' for egress queue (3, 48, 2) is blade B'4.

FIG. 8 illustrates the actions 200A taken by the egress queue manager 106 when generating a congestion message 124. In one embodiment, at decision block 202, the egress queue manager 106 determines that the egress queue 112 is congested by comparing the current depth of the egress queue in question to the upper threshold 122 previously established. At process block 204, when the egress queue in question is determined to be congested, the egress queue manager 106 generates a congestion message 124 that uniquely identifies the congested egress queue by blade identification 134, port identification 136, and queue identification 138, notated herein as (B, P, Q). The egress queue manager 106 sends the congestion message 124 to the ingress queue manager 108 on the blade 102 (see FIG. 10 for a description of the actions 200C taken by the ingress queue manager 108 upon receipt of the congestion message 124).

At decision block 206, the egress queue manager 106 further determines whether the port to which the traffic flows in the egress queue 112 are destined is a backplane port 118B or an outer port 118A. At process block 208, when the port is a backplane port 118B, then the egress queue 112 is a backplane queue 112B. This implies that there is not enough bandwidth on the backplane 104 for the subchannel to the blade to which the backplane queue 112B is destined (e.g. subchannel 4 to blade B'4 for port P48). Since there is no true QoS mechanism on the backplane 104, it is possible that other blades are attempting to send traffic on the same subchannel 128/130 causing the subchannel 128/130 to choke. Therefore, in addition to sending the congestion message 124 to the ingress queue manager 108 on the local blade 102, at process block 208 the egress queue manager 106 slows down the enqueuing of packets to the destination blade B' to which the backplane queue 112B is mapped to the minimum rate established for the quality of service policy for affected traffic flows. In addition, at process block 210, the egress queue manager 106 sends the congestion message 124 to all of the egress queue managers 106 on the other blades so that their egress queue managers 106 can take the same actions as the egress queue manager 106 on the local blade (see FIG. 9 for a description of the actions 200B taken by the egress queue manager 106 upon receipt of the congestion message 124).

Figure 9:
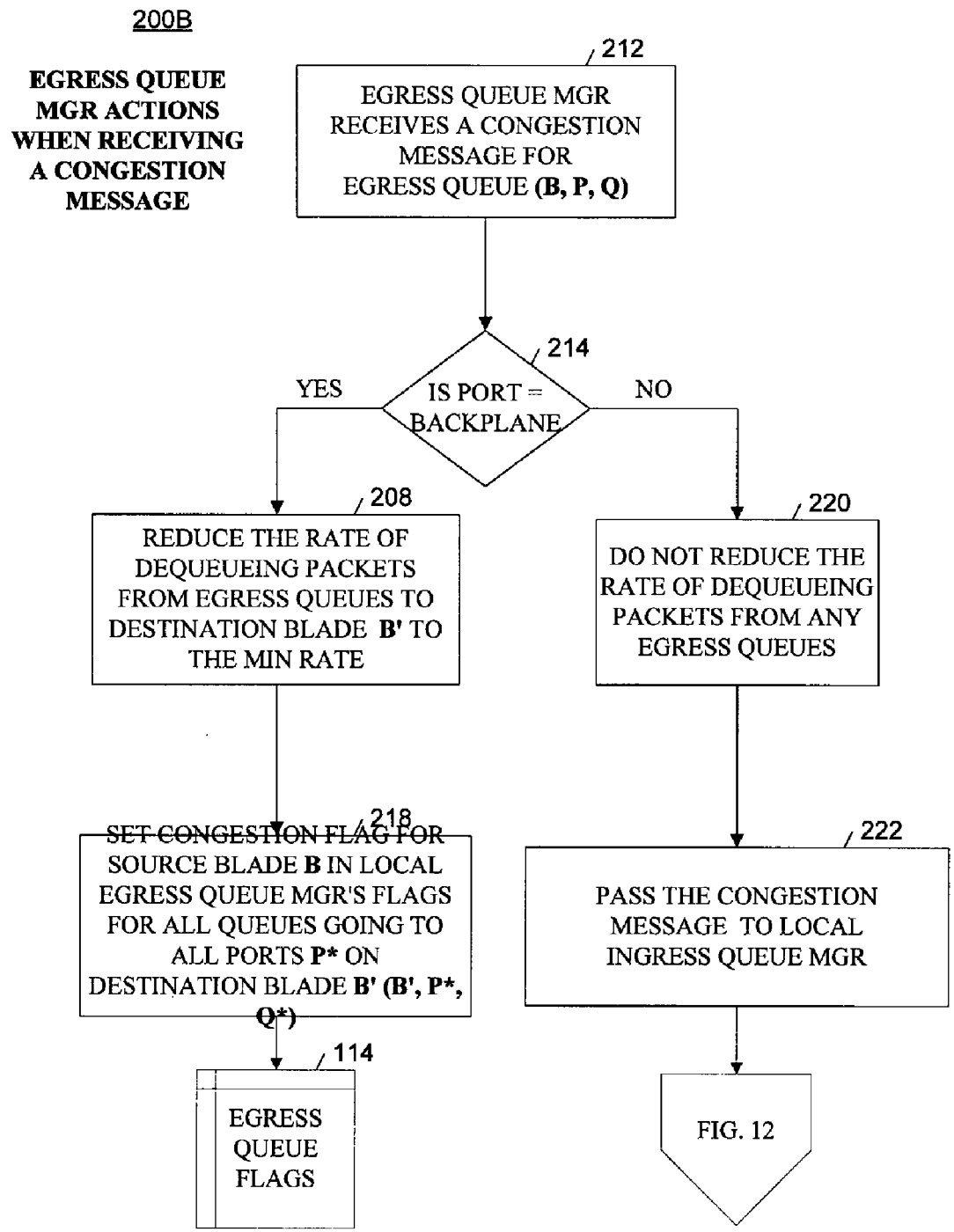

FIG. 9 illustrates the actions 200B taken by the egress queue manager 106 when receiving a congestion message 124. In one embodiment, at process block 212, the egress queue manager 106 receives the congestion message 124 that uniquely identifies the congested egress queue (B, P, Q). At decision block 214, the egress queue manager 106 further determines whether the port P identified in the congested egress queue identifier (B, P, Q) is a backplane port 118B or an outer port 118A. When the port P is a backplane port 118B, then the congested egress queue 112 is a backplane queue 112B. This implies that the backplane 104 is congested for all of the traffic destined to the blade B' that corresponds to the subchannel associated with the port P in the congested egress queue identifier (B, P, Q). To alleviate this problem, the egress queue manager 106 takes the same actions taken by the egress queue manager that generated the congestion messate, i.e. at process block 208 the egress queue manager 106 slows down the dequeuing of packets destined for the corresponding blade B' to the minimum rate established for the quality of service policy for the affected traffic flows. Although it is unnecessary to send this congestion message 124 to the local ingress queue manager 108 on the receiving blade, the actions taken in process block 208 may have the effect of congesting the local egress queues on the receiving blade since the egress queues may be dequeuing packets at a slower rate than they are receiving them. However, the egress queue manager 106 will determine when and if that occurs and generate and send a congestion message 124 to the local ingress queues accordingly, as described earlier with reference to FIG. 8 and actions 200A.

In addition, at process block 218, the egress queue manager 106 sets the egress queue flag 114 for the destination blade B' that corresponds to the backplane port P identified in the congested egress queue identifier (B, P, Q) of the congestion message 124. In one embodiment, the egress queue manager 106 sets the nth bit of the bitmask that comprises the egress queue flags 114, where the nth bit corresponds to the blade B identified in the congested egress queue identifier (B, P, Q), since blade B sent the congested message 124.

At process block 220, when the port P is an outer port 118A, then it is not necessary for the egress queue manager 106 to slow down the dequeuing of packets for any destination. At process block 222, the egress queue manager 106 passes the received congestion message 124 to the ingress queue manager 108 so that the ingress queue manager 108 can take actions to slow down the ingress queues 110 that are responsible for sending packets to the congested queue identified in the congested queue message identifier (B, P, Q).

Figure 10:
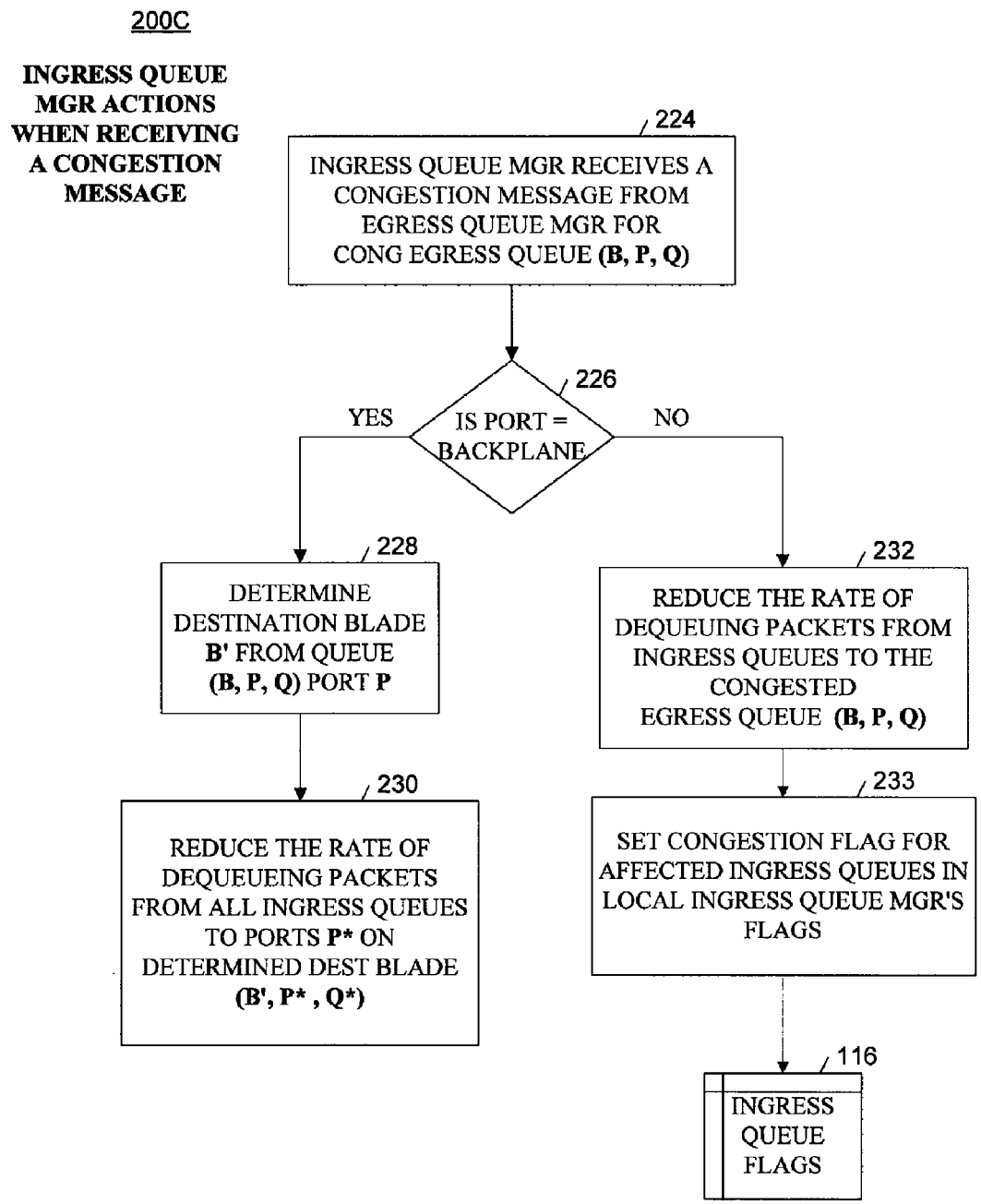

FIG. 10 illustrates the actions 200C taken by the ingress queue manager 108 when receiving a congestion message 124. In one embodiment, at process block 224, the ingress queue manager 108 receives the congestion message 124 that uniquely identifies the congested egress queue (B, P, Q). At decision block 226, the ingress queue manager 108 further determines whether the port P identified in the congested message identifier (B, P, Q) is a backplane port 118B or an outer port 118A. When the port P is a backplane port 118B, then the congested egress queue 112 is a backplane queue 112B. This implies that the backplane 104 is congested for all of the traffic destined to the blade that corresponds to the subchannel associated with the port P in the congested egress queue identifier (B, P, Q). To alleviate this problem, at process block 228 the ingress queue manager 108 determines the destination blade B' that corresponds to the backplane port P identified in the congested egress queue identifier (B, P, Q) of the congestion message 124, and at process block 230, the ingress queue manager 108 slows down the rate of dequeuing packets from ingress queues 110 destined for all ports P* on the corresponding blade B' to the minimum rate established for the quality of service policy for the affected traffic flows.

When the port P is an outer port 118A, then it is not necessary for the ingress queue manager 108 to determine the destination blade B'. Rather, at process block 232, the ingress queue manager 108 need reduce the rate at which packets are dequeued from only those local ingress queues 110 that are responsible for sending packets to the congested queue identified in the congested queue message identifier (B, P, Q). The local ingress queues 110 that are responsible for sending packets to the congested queue are determined by comparing a list of destinations corresponding to each of the ingress queues 110 to the destination of the queue identified in the congested queue message identifier (B, P, Q). Those ingress queues 110 with matching destination ports are the ones that may be responsible for the congestion. In one embodiment, the list of destinations corresponding to each of the ingress queues 110 is provided in a queue map.

Whether the port P is an outer port 118A or a backplane port 118B, at process block 233, the ingress queue manager 106 sets congestion flags for the affected ingress queues (i.e., those ingress queues whose packet rates were reduced) in the local ingress queue flags 116.

In a properly configured network under normal conditions, the egress queues 112 should only be congested for short periods of time. To return the affected queues to their normal packet rates, the egress queue managers 106 generate resume messages 124 when the queue depth of the congested egress queues fall below a predetermined lower threshold.

Figure 11:
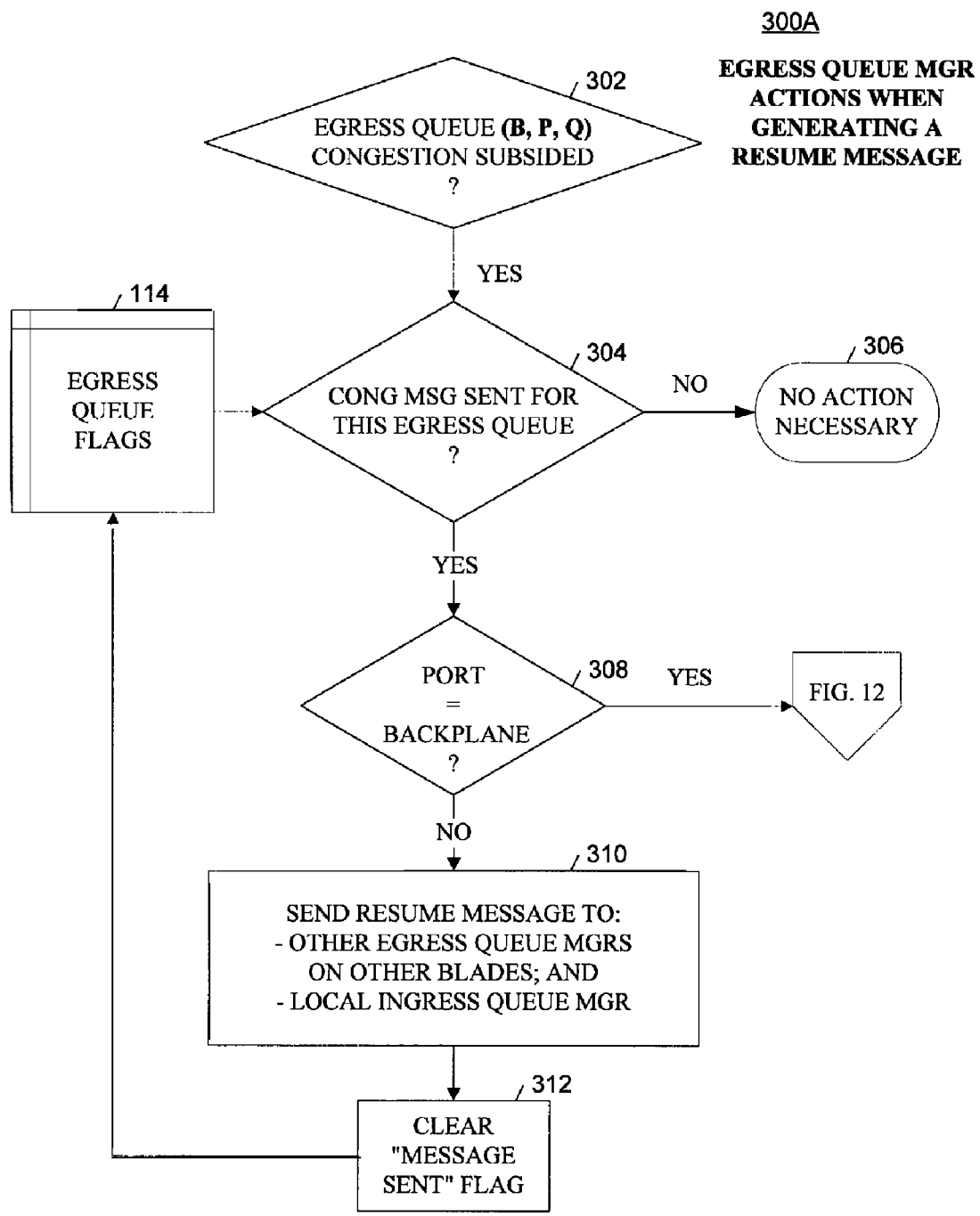

FIG. 11 illustrates the actions 300A taken by the egress queue manager 106 when generating a resume message 124. In one embodiment, at decision block 302, the egress queue manager 106 determines that the congestion in the egress queue 112 has subsided by comparing the current depth of the egress queue in question to the lower threshold 122 previously established. At decision block 304, when the congestion in the egress queue in question is determined to have subsided, the egress queue manager 106 further determines whether a congestion message 124 was previously sent for this egress queue 112 using the egress queue flags 124. When no congestion message was previously sent, then no action is necessary 306. However, when a congestion message 124 was sent, then the egress queue manager 106 generates a resume message to the ingress queue manager 108 to resume the normal QoS policies, (i.e., the normal packet sending rates) for the affected ingress queues 110.

At decision block 308, the egress queue manager 106 determines whether the port to which the traffic flows in the egress queue 112 are destined is a backplane port 118B or an outer port 118A. When the egress queue manager 106 determines that the port is an outer port 118A, the egress queue manager 106 generates a resume message 124 that uniquely identifies the egress queue 112 in question by blade identification 134, port identification 136, and queue identification 138, denoted as message identifier (B, P, Q). The egress queue manager 106 sends the resume message 124 to all of the egress queue managers 106 on the other blades 102, and to the ingress queue manager 108 on the local blade 102 (see FIG. 14 for a description of the actions 300D taken by the ingress queue manager 108 upon receipt of the resume message 124).

Figure 12:
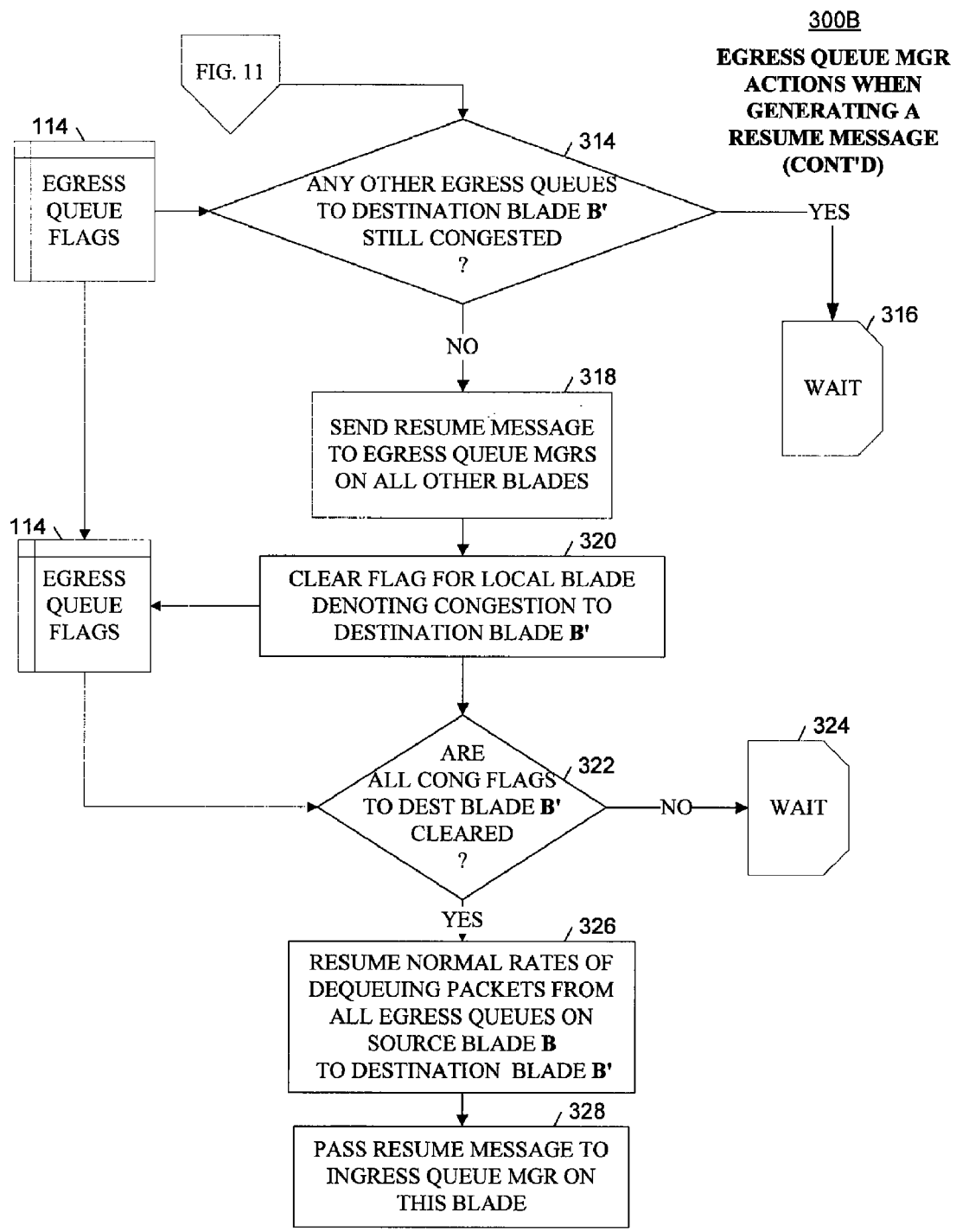

FIG. 12 illustrates further actions 300B taken by the egress queue manager 106 when generating a resume message 124. When the egress queue manager 106 determines that the port is a backplane port 118B, the egress queue manager 106 further determines at process block 314 whether other egress queues 112 are still congested whose destinations are on the same blade B' that corresponds to the subchannel associated with the port P in the resume message identifier (B, P, Q), in accordance with the egress queue flags 114 previously set when the queues originally became congested. When there are other congested egress queues, then at process block 316, the egress queue manager 106 waits until the other congested egress queues are emptied, i.e. until the egress queue flags 114 for those other congested egress queues are cleared. When there are no other congested egress queues 112, then at process block 320, the egress process manager 106 clears the local blade's flag in egress queue flags 114 denoting backplane channel congestion for the backplane blade B'. Before taking any further action the egress queue manager 106 further determines whether the other blade's flags in egress queue flags 114 denoting congestion for the backplane blade B' have all been cleared. When they have not all been cleared, then the egress queue manager 106 takes no further action but waits 324 until the next resume message is received. At process block 326, the egress queue manager 106 resumes normal QOS policies by resuming normal rates for dequeuing packets from all of its egress queues 112 whose destinations are on the same blade B' that corresponds to the subchannel associated with the port P in the resume egress queue identifier (B, P, Q). At processing block 328, the egress queue manager 106 passes the resume message 124 to the ingress queue manager 108 on the local blade 102 (see FIG. 14 for a description of the actions 300D taken by the ingress queue manager 108 upon receipt of the resume message 124).

Figure 13:
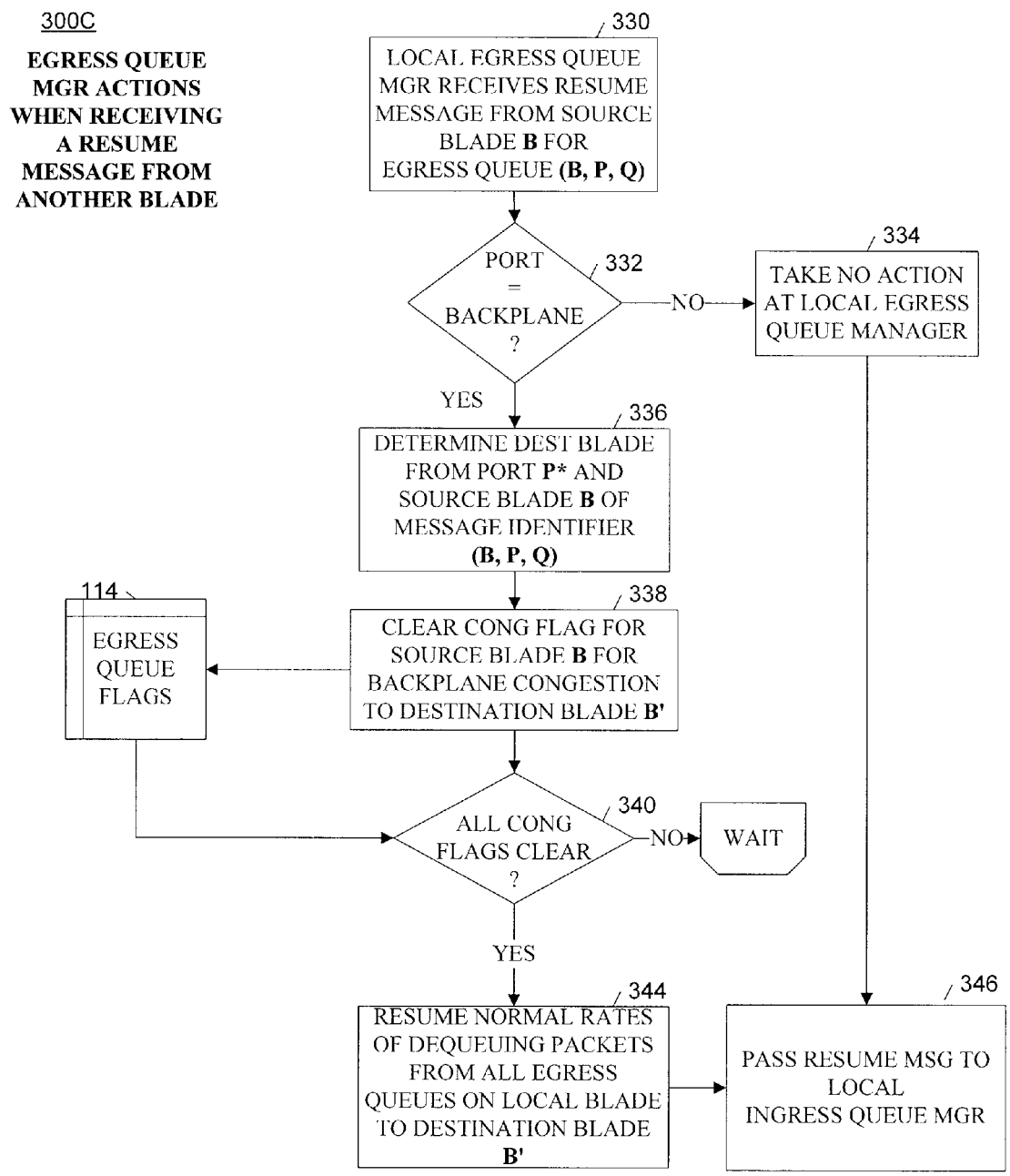

FIG. 13 illustrates actions 300C taken by the egress queue manager 106 when receiving a resume message 124 from another blade. In one embodiment, at process block 330, the egress queue manager 106 receives the resume message 124 that uniquely identifies the previously congested egress queue (B, P, Q). At decision block 332, the egress queue manager 106 further determines whether the port P identified in the resume message identifier (B, P, Q) is a backplane port 118B or an outer port 118A.

When the port P is a backplane port 118B, then the congested egress queue 112 is a backplane queue 112B. This implies that the backplane congestion to the destination Blade B' corresponding to the backplane port P is subsiding. Thus, at process block 338, the egress queue manager 106 clears the Bth bit of the flag for the destination Blade B', where the Bth bit corresponds to source Blade B identified in the resume egress queue identifier (B, P, Q) of the resume message 124. Before resuming normal QoS policies for this destination blade, however, the egress queue flags 124 must be checked to see whether the backplane congestion for all of the congested backplane queues on the other blades for this destination Blade B' have subsided. At decision block 340, the egress queue manager 106 determines whether backplane congestion in all of the source blades (i.e., all of the other blades in the router vis a vis the local blade) has subsided. For example, when the egress flags 114 are a bitmap, then at decision block 340, the egress queue manager 106 determines whether all of the bits in the flag for destination blade B' for all of the other blades are clear. When all of the backplane congestion has not yet subsided, i.e., the bits are not yet all clear, the egress queue manager 106 waits at wait block 342 for the next resume message before taking any further action. However, when all of the backplane congestion has subsided, i.e., when all of the bits are clear, then at process block 344, the egress queue manager 106 resumes normal rates of dequeuing packets from the egress queues 112 to the destination Blade B'.

In one embodiment, at process block 346 the egress queue manager 106 further passes the resume message 124 to the ingress queue manager 108 on the local blade. When the port P is an outer port 118A, then it is not necessary for the egress queue manager 108 to determine the destination blade B' or to resume normal rates of dequeuing packets from the egress queues 112. Rather, the egress queue manager 106 advances directly to process block 346 to pass the resume message 124 to the ingress queue manager 108 on the local blade (see FIG. 14 for a description of the actions 300D taken by the ingress queue manager 108 upon receipt of the resume message 124).

Figure 14:
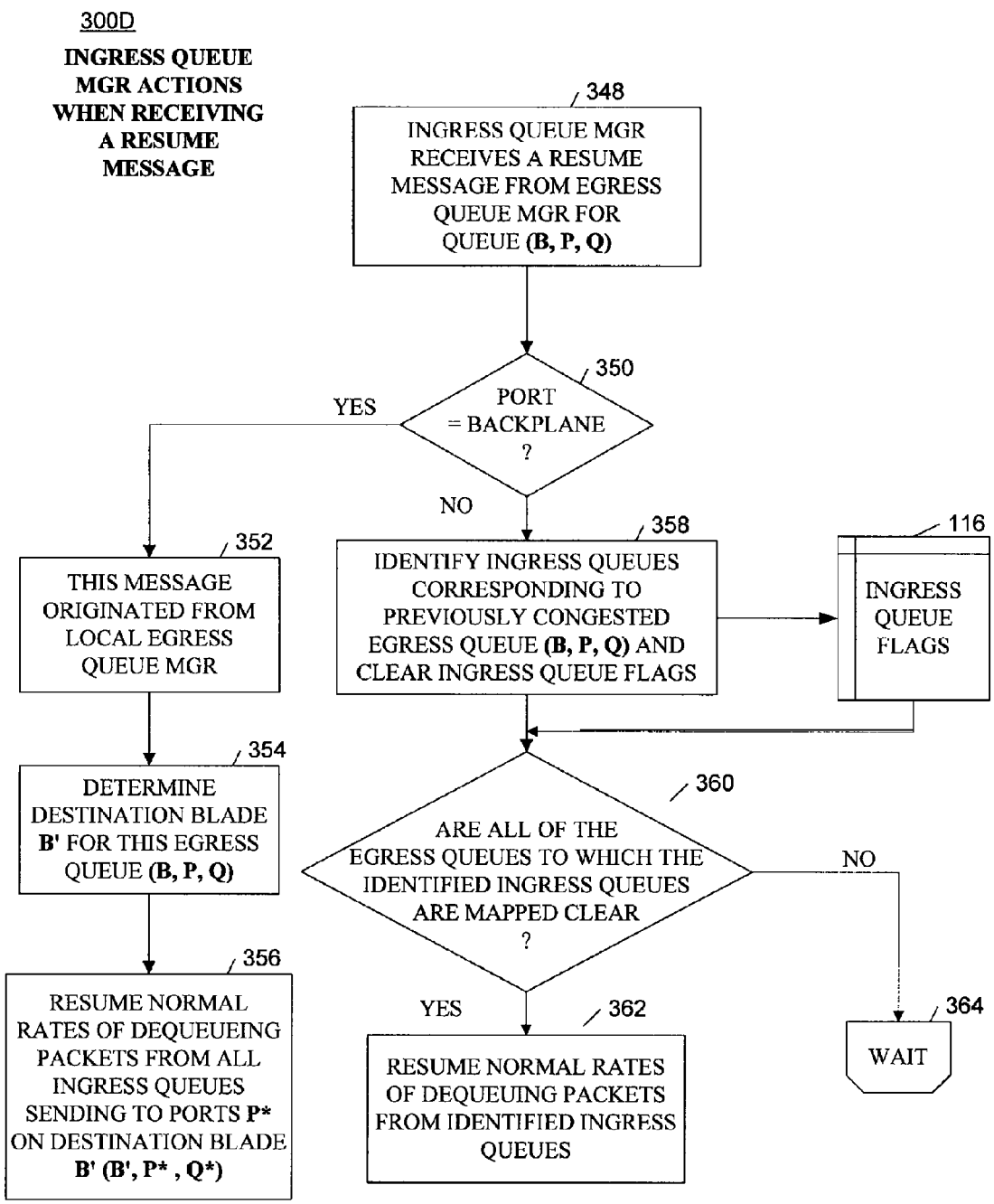

FIG. 14 illustrates the actions 300D taken by the ingress queue manager 108 when receiving a resume message 124. In one embodiment, at process block 348, the ingress queue manager 108 receives from the egress queue manager 106, the resume message 124 that uniquely identifies the previously congested egress queue (B, P, Q). At decision block 350, the ingress queue manager 108 further determines whether the port P identified in the resume message identifier (B, P, Q) is a backplane port 118B or an outer port 118A. When the port P is a backplane port 118B, then the previously congested egress queue 112 is a backplane queue 112B. This implies that the backplane 104 was congested for all of the traffic destined to the destination blade B' that corresponds to the subchannel associated with the port P in the resume egress queue identifier (B, P, Q). At process block 354 the ingress queue manager 108 determines the destination blade B' that corresponds to the backplane port P identified in the congested egress queue identifier (B, P, Q) of the resume message 124, and at process block 356, the ingress queue manager 108 resumes normal rates of dequeuing packets from ingress queues 110 that are mapped to all destination ports P* on the corresponding destination blade B'.

When the port P is an outer port 118A, then it is not necessary for the ingress queue manager 108 to determine the destination blade B'. Rather, at process block 358, the ingress queue manager 108 need only identify the ingress queues 110 corresponding to the previously congested egress queue 112 and clear the ingress queue manager flags 116 accordingly. In one embodiment, the ingress queues 110 are identified using a queue map, which maps the ingress queues to the destination ports on the blade. At decision block 360, before resuming normal packet rates for dequeuing packets from the identified ingress queues, the ingress queue manager first checks whether congestion on all of the egress queues to which the identified ingress queues can send packets (i.e., all of the egress queues to which the ingress queues in question are mapped) has now subsided. If not, the ingress queue manager 108 waits until receiving the next resume message 124 before taking any further action. When all of the congestion has subsided, as is indicated when all the ingress queue manager flags 116 are clear, then the ingress queue manager 108 can resume normal rates when dequeueing packets from ingress queues 110 mapped to the previously congested egress queue identified in the resume message identifier (B, P, Q).

The foregoing descriptions of FIGS. 8-14 pertain primarily to actions taken at the ingress and egress queue managers for unicast traffic. Recall, however, that the ingress queues may be designated as unicast ingress queues or multicast ingress queues. When handling multicast traffic, the ingress queue managers do not alter or reduce the dequeueing of packets from the multicast ingress queues responsible for the congestion. Rather, quality of service for multicast traffic is enabled by actions taken at the egress queue managers in accordance with multicast scheduling flags. The actions taken depend on whether the congested egress queue is an outer queue or a backplane queue. When the congested egress queue is an outer queue, the egress queue manager refrains from enqueueing multicast packets to the destination ports associated with the congested outer queue until the congestion subsides. When the congested egress queue is a backplane queue, the egress queue manager refrains from enqueuing multicast packets to the destination ports on the destination blade associated with the congested backplane queue until the congestion subsides.

In the case of congested outer queues, the ingress queue manager takes no action to reduce the responsible multicast ingress queue (or queues) because it is unfair to reduce the packet rates for an entire multicast stream when just one or even some of the multicast branches uses the congested outer queue. Moreover, the congestion may be caused by both unicast and multicast packets. The unicast packets will be controlled as described in the foregoing FIGS. 8-14. By handling the congestion in the egress queue manager as described in FIG. 15, only the multicast packets that are actually causing the congestion are affected.

In the case of congested backplane queues, the ingress queue manager takes no action to reduce the responsible multicast ingress queue (or queues) because, again, it is unfair to reduce the packet rates for an entire multicast stream when just one or even some of the multicast branches uses the congested backplane queue. Again, by handling the congestion in the egress queue manager as described in FIG. 15, only the multicast packets that are actually causing the congestion are affected.

Figure 15:
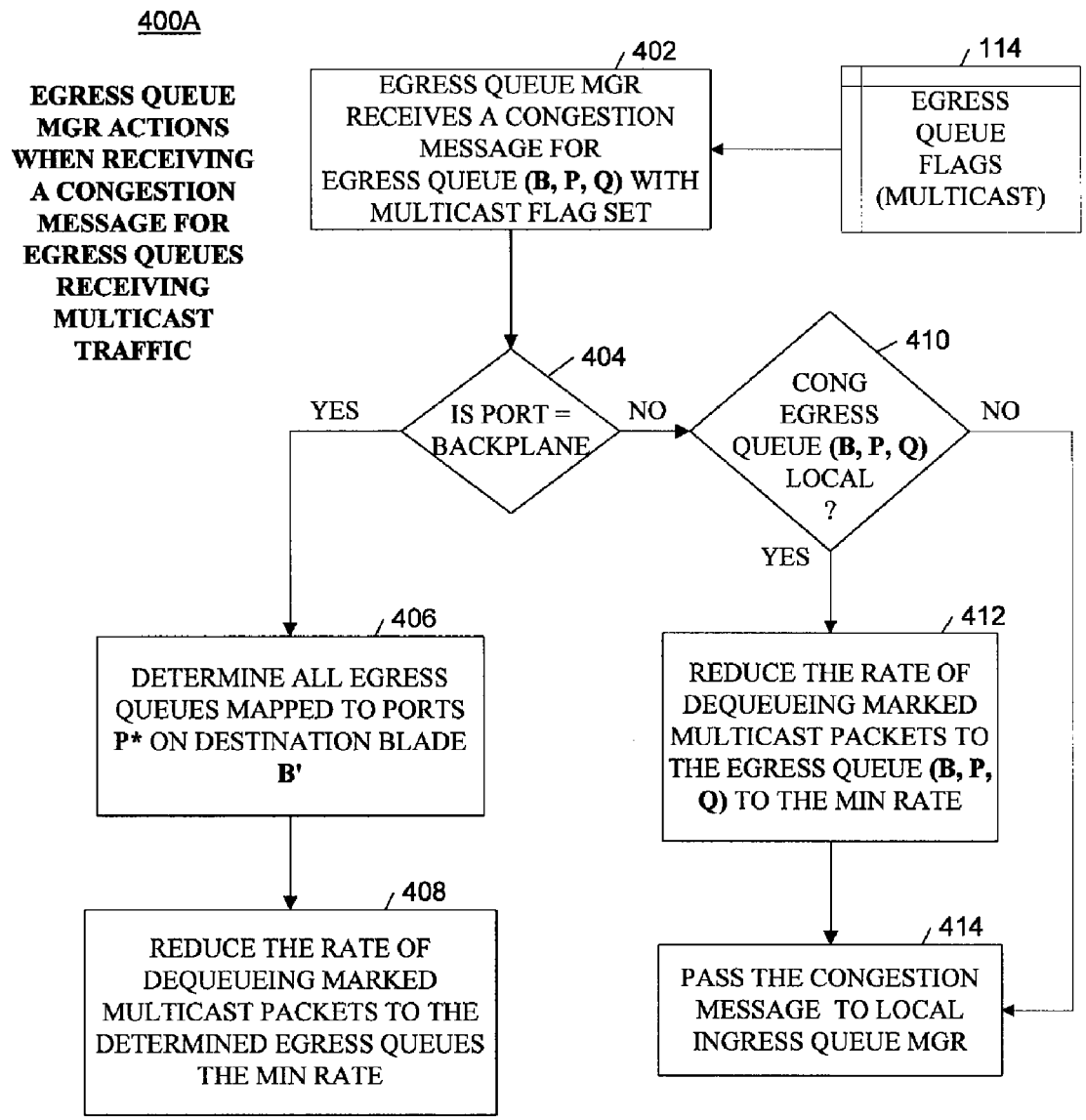

FIG. 15 illustrates the actions 400 taken by the egress queue manager 106 when receiving a congestion message 124 in the context of multicast traffic. A multicast scheduling flag 114 is associated with each egress queue capable of receiving a packet from a multicast queue, and may be set in advance by a network administrator or automatically upon the detection of multicast traffic. The multicast packets themselves will be marked as multicast packets in a manner known to one or ordinary skill in the art. In one embodiment, at process block 402, the egress queue manager 106 receives a congestion message 124 that uniquely identifies a congested egress queue (B, P, Q) whose multicast scheduling flag 114 has been set. The congestion message 124 may have been generated by the egress queue manager 106 on the local blade B or another source blade in the router. At decision block 404, the egress queue manager 106 further determines whether the port P identified in the congestion message identifier (B, P, Q) is a backplane port 118B or an outer port 118A. When the port P is a backplane port 118B, then the congested egress queue 112 is a backplane queue 112B. This implies that the backplane 104 is congested for all of the traffic (multicast or unicast) destined to the destination blade B' that corresponds to the subchannel associated with the port P in the egress queue identifier (B, P, Q). At process block 406 the egress queue manager 106 determines the destination blade B' that corresponds to the backplane port P identified in the congested egress queue identifier (B, P, Q) of the congestion message 124. At process block 408, the egress queue manager 106 reduces the rate of enqueuing marked multicast packets to the egress queues mapped to all destination ports P* on the corresponding destination blade B'. In this way, only the marked multicast packets that are actually contributing to the congestion are affected, and quality of service in enabled across the backplane switch for multicast ingress queues.

When the port P is an outer port 118A, then it is not necessary for the egress queue manager 106 to determine the destination blade B'. Rather, at decision block 410, the egress queue manager 106 determines from the blade identification B of the congested egress queue identifier (B, P, Q) whether the congested queue is a queue on the local blade (B=local blade) or whether the congested queue is a queue on another blade (B not=local blade). When the congested egress queue is local, then at processing block 412, the egress queue manager 106 reduces the rate of enqueueing marked multicast packets to the congested egress queue (B, P, Q) to the minimum rate. In either case (when local or not local) the egress queue manager 106 at processing block 414 passes the congestion message 124 to the local ingress queue manager 108. In this way, only the marked multicast packets that are actually contributing to the congestion are affected, and quality of service in enabled for multicast ingress queues by the egress queue manager.

When the congestion subsides, the processing to resume normal packet enqueuing rates on the egress queue manager in the context of multicast traffic is the same as for unicast traffic as described in FIGS. 8-14.

Figure 16:
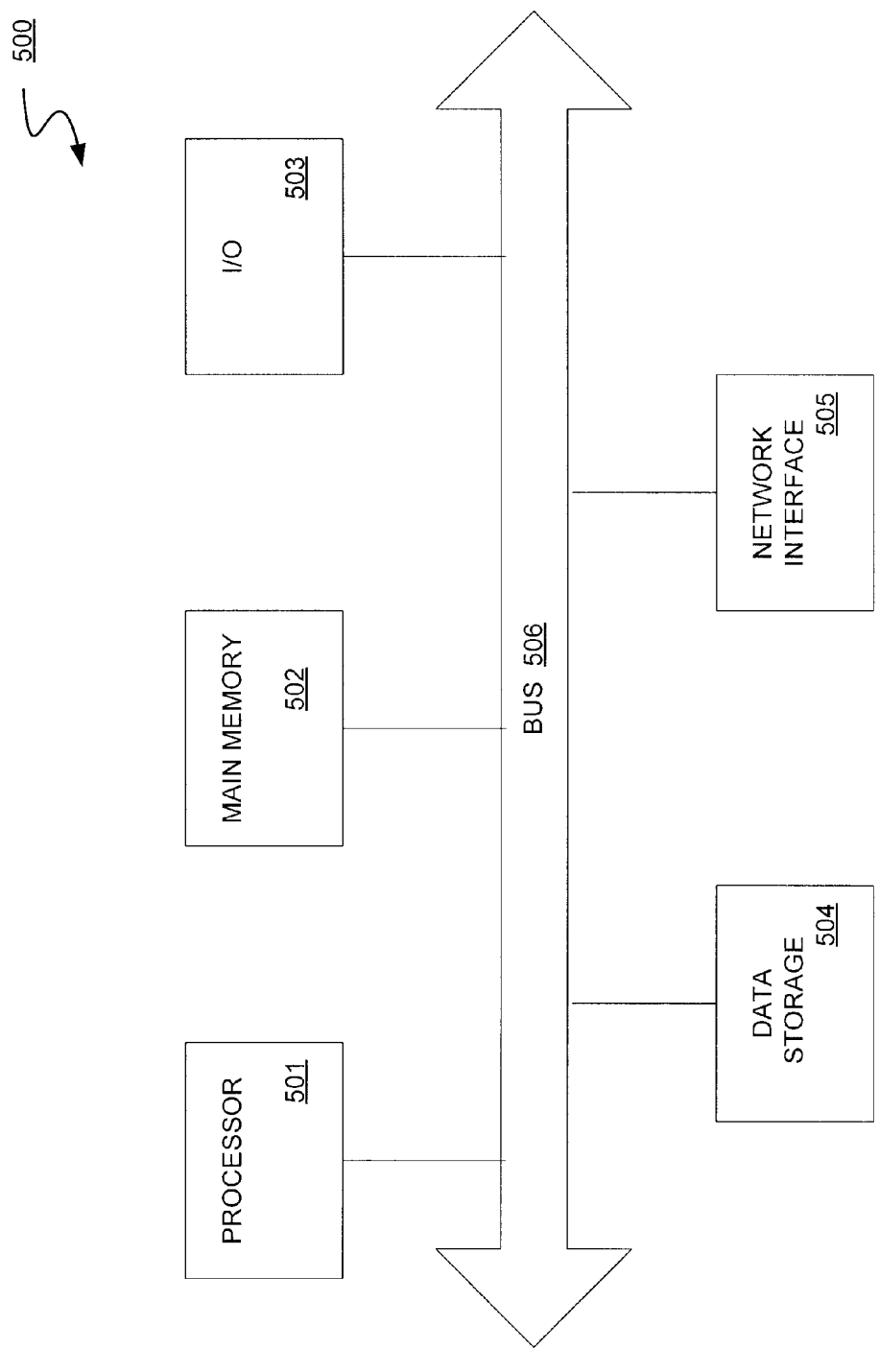
FIG. 16 illustrates one embodiment of a suitable computing environment in which certain aspects of the invention illustrated in FIGS. 2-15 may be practiced.

FIG. 16 illustrates one embodiment of a suitable computing environment in which certain aspects of the invention illustrated in FIGS. 2-15 may be practiced. In one embodiment, the method for a messaging system 101 may be implemented on a computer system 500 having components 501-506, including a processor 501, a memory 502, an Input/Output device 503, a data storage 504, and a network interface 505, coupled to each other via a bus 508. The components perform their conventional functions known in the art and provide the means for implementing the messaging system 101. Collectively, these components represent a broad category of hardware systems, including but not limited to general purpose computer systems and specialized packet forwarding devices.

In one embodiment, the memory component 502, may include one or more of random access memory (RAM), and nonvolatile storage devices (e.g., magnetic or optical disks) on which are stored instructions and data for use by processor 501, including the instructions and data that comprise the ingress and egress queues 110/112, the ingress and egress queue managers 108/106, and the ingress and egress queue flags 116/114, as well as the messages 124, queue thresholds 122 and other components of the messaging system 101.

In one embodiment, the network interface component 505 may include the input ports 120, the outer ports 118A, and the backplane ports 118B, as well as the subchannels 130 across the crossbar/backplane 104. The data storage component 504 may also represent the ingress and egress queues 110/112, the ingress and egress queue flags 116/114, the queue thresholds 122, and any other storage areas such as packet buffers to the ingress and egress queues and used by the packet forwarding device 100 for forwarding network packets or messages.

It is to be appreciated that various components of computer system 500 may be rearranged, and that certain implementations of the present invention may not require nor include all of the above components. Furthermore, additional components may be included in system 500, such as additional processors (e.g., a digital signal processor), storage devices, memories, network/communication interfaces, etc.

In the illustrated embodiment of FIG. 16, the method and apparatus for a messaging system 101 in accordance with one embodiment of the invention as discussed above may be implemented as a series of software routines executed by computer system 500. The software routines may comprise a plurality or series of instructions, code sequences, configuration information, or other data to be accessed and/or executed by a processing system such as one or more of processor 501. Initially, the series of instructions, code sequences, configuration information, or other data may be stored on a data storage 504 and transferred to memory 502 via bus 506. It is to be appreciated that the series of instructions, code sequences, configuration information, or other data can be stored a data storage 504 using any conventional computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be stored on a propagated data signal received from a remote storage device, such as a server on a network, via a network/communication interface 505. The instructions, code sequences, configuration information, or other data may be copied from the data storage 504, such as mass storage, or from the propagated data signal into a memory 502 and accessed and executed by processor 501.

In alternate embodiments, the present invention is implemented in discrete hardware or firmware. For example, one or more application specific integrated circuits (ASICs) could be programmed with some or all of the above-described functions of the present invention. In one embodiment the functions of the egress queue manager 106 and its associated egress queues 112 may be implemented in one ASIC, and the ingress queue manager 108 and its associated ingress queues 110 on another ASIC communicatively coupled to the first ASIC.

Accordingly, a novel method and system is described for a method and apparatus for enabling quality of service across a switched backplane. From the foregoing description, those skilled in the art will recognize that many other variations of the present invention are possible. In particular, while the present invention has been described as being implemented in a network comprising one or more packet forwarding devices 100 connecting a LAN to another network, some of the logic may be distributed in other components of a network or internetwork application. Thus, the present invention is not limited by the details described. Instead, the present invention can be practiced with modifications and alterations within the spirit and scope of the appended claims.

We claim:

1. A method for propagating quality of service across a switched backplane comprising:
   setting a minimum rate at which packets are dequeued from ingress queues to backplane ports for maintaining a quality of service, the backplane ports connecting to blades on the switched backplane using a backplane channel;
   determining that an egress queue mapped to a backplane port is congested, upon receiving by an ingress queue manager a notification from an egress queue manager of congestion on the egress queue in a congestion message identifying the congested egress queue, the congestion message comprising:
      a blade identifier that identifies a blade on which the congested egress queue resides,
      a port identifier that identifies a port to which the congested egress queue is mapped, and
      a queue identifier that identifies a queue number associated with congested egress queue;
   determining a destination blade of the backplane port to which the congested egress queue is mapped;
   maintaining the rates of dequeuing packets from the ingress queues to the backplane ports at or above the minimum rate while reducing a rate of enqueuing packets to all egress queues mapped to any backplane ports connecting to the destination blade of the backplane port to which the congested egress queue is mapped, including the rates of ingress queues residing on different blades from the egress queues for which the rate of enqueuing packets was reduced;
   determining that the previously congested egress queue is no longer congested;
   delaying resumption of a normal rate of enqueuing packets to all egress queues mapped to any backplane ports connecting to the destination blade of the backplane port to which the congested egress queue is mapped until determining that the previously congested egress queue is no longer congested and that all egress queues mapped to backplane ports connecting to the destination blade are not congested upon receiving a notification in an ingress queue manager from an egress queue manager to resume a normal rate of enqueueing packets for all egress queues mapped to backplane ports connecting to the destination blade, including receiving the notification in ingress queue managers for the ingress queues residing on different blades from the egress queues for which the rate of enqueuing packets was reduced.

2. The method of claim 1, wherein the notification to resume a normal rate of enqueueing packets is a resume message identifying the previously congested egress queue, the resume message comprising:
   a blade identifier that identifies a blade on which the previously congested egress queue resides;
   a port identifier that identifies a port to which the previously congested egress queue is mapped; and
   a queue identifier that identifies a queue number associated with previously congested egress queue.

3. A non-transitory machine-readable storage medium, storing program instructions that, when executed, cause a data processing system to perform a method of propagating quality of service across a switched backplane comprising:
   setting a minimum rate at which packets are dequeued from ingress queues to backplane ports for maintaining a quality of service, the backplane ports connecting to blades on the switched backplane using a backplane channel;
   determining that an egress queue mapped to a backplane port is congested upon receiving by an ingress queue manager a notification from an egress queue manager of congestion on the egress queue in a congestion message identifying the congested egress queue, the congestion message comprising:
      a blade identifier that identifies a blade on which the congested egress queue resides,
      a port identifier that identifies a port to which the congested egress queue is mapped, and
      a queue identifier that identifies a queue number associated with congested egress queue;
   determining a destination blade of the backplane port to which the congested egress queue is mapped;
   maintaining the rates of dequeuing packets from the ingress queues to the backplane ports at or above the minimum rate while reducing a rate of enqueuing packets to all egress queues mapped to any backplane ports connecting to the destination blade of the backplane port to which the congested egress queue is mapped, including the rates of ingress queues residing on different blades from the egress queues for which the rate of enqueuing packets was reduced;
   determining that the previously congested egress queue is no longer congested;
   delaying resumption of a normal rate of enqueuing packets to all egress queues mapped to any backplane ports connecting to the destination blade of the backplane port to which the congested egress queue is mapped until determining that the previously congested egress queue is no longer congested and that all egress queues mapped to backplane ports connecting to the destination blade are not congested upon receiving a notification in an ingress queue manager from an egress queue manager to resume a normal rate of enqueueing packets for all egress queues mapped to backplane ports connecting to the destination blade, including receiving the notification in ingress queue managers for the ingress queues residing on different blades from the egress queues for which the rate of enqueuing packets was reduced.

4. The machine-readable storage medium of claim 3, wherein the notification to resume a normal rate of enqueueing packets is a resume message identifying the previously congested egress queue, the resume message comprising:

a blade identifier that identifies a blade on which the previously congested egress queue resides;
a port identifier that identifies a port to which the previously congested egress queue is mapped; and
a queue identifier that identifies a queue number associated with previously congested egress queue.

* * * * *